United States Patent
Bulsink et al.

(10) Patent No.: US 12,433,318 B2
(45) Date of Patent: Oct. 7, 2025

(54) PRODUCT DISPENSING SYSTEM, HOLDER AND MANUFACTURING METHOD

(71) Applicant: FrieslandCampina Nederland B.V., Amersfoort (NL)

(72) Inventors: Dirk Jan Bulsink, Wageningen (NL); Joren Sweeck, Wageningen (NL); Johan Frederik Dannenberg, Wageningen (NL); Franciscus Johannes Knapen, Wageningen (NL)

(73) Assignee: FRIESLANDCAMPINA NEDERLAND B.V., Amersfoort (NL)

( * ) Notice: Subject to any disclaimer, the term of this patent is extended or adjusted under 35 U.S.C. 154(b) by 684 days.

(21) Appl. No.: 17/432,437

(22) PCT Filed: Feb. 18, 2020

(86) PCT No.: PCT/NL2020/050091
§ 371 (c)(1),
(2) Date: Aug. 19, 2021

(87) PCT Pub. No.: WO2020/171698
PCT Pub. Date: Aug. 27, 2020

(65) Prior Publication Data
US 2022/0142223 A1   May 12, 2022

(30) Foreign Application Priority Data
Feb. 19, 2019 (EP) .................................. 19158118

(51) Int. Cl.
*A23P 30/40* (2016.01)
*A47J 31/44* (2006.01)

(52) U.S. Cl.
CPC ........... *A23P 30/40* (2016.08); *A47J 31/4485* (2013.01)

(58) Field of Classification Search
CPC .............................. A23P 30/40; A47J 31/4485
(Continued)

(56) References Cited

U.S. PATENT DOCUMENTS

| | | | |
|---|---|---|---|
| 9,833,745 B2 | 12/2017 | Goebbert et al. | |
| 2012/0269945 A1* | 10/2012 | Wijnen | B01F 23/2323 222/145.6 |
| 2018/0220837 A1* | 8/2018 | Midden | A47J 43/121 |

FOREIGN PATENT DOCUMENTS

| CN | 101912701 A | 12/2010 |
|---|---|---|
| CN | 103747853 A | 4/2014 |

(Continued)

OTHER PUBLICATIONS

Chinese Office Action corresponding to patent application No. CN 202080014772.4 issued May 25, 2022.

*Primary Examiner* — Steven W Crabb
*Assistant Examiner* — Dilnessa B Belay
(74) *Attorney, Agent, or Firm* — Hoffmann & Baron, LLP

(57) ABSTRACT

A product dispensing system, including a holder which contains a product to be dispensed, the holder having a product processing unit for processing and discharging product coming from the holder, wherein the product processing unit (PPU) is provided with a microfiltration device which is provided with a product entrance for supply of product, wherein the microfiltration device is connectable to a gas supply for supplying gas to the product during product discharge, wherein the microfiltration device is provided with a housing defining an interior processing space, wherein the processing space is separated by a tubular microfiltration element, having gas transmissive pores, into a gas supply space from a product feed-through channel, wherein the gas supply space is associated with a gas inlet of the housing and the product feed-through channel is (Continued)

associated with a product entrance of the housing, wherein the housing includes an exit for discharge of product provided with gas.

28 Claims, 11 Drawing Sheets

(58) Field of Classification Search
USPC .......................................................... 99/323
See application file for complete search history.

(56) References Cited

FOREIGN PATENT DOCUMENTS

| | | |
|---|---|---|
| CN | 204073574 U | 1/2015 |
| CN | 104853655 A | 8/2015 |
| CN | 108602020 A | 9/2018 |
| EP | 1676618 A1 | 7/2006 |
| EP | 2153882 A1 | 2/2010 |
| JP | 2005143372 A | 6/2005 |
| WO | 0074825 A1 | 12/2000 |
| WO | 2009110794 A1 | 9/2009 |
| WO | 2011028117 A1 | 3/2011 |
| WO | 2013020887 A1 | 2/2013 |
| WO | 2014069993 A1 | 5/2014 |
| WO | 2014069994 A1 | 5/2014 |
| WO | 2017131126 A1 | 3/2017 |

\* cited by examiner

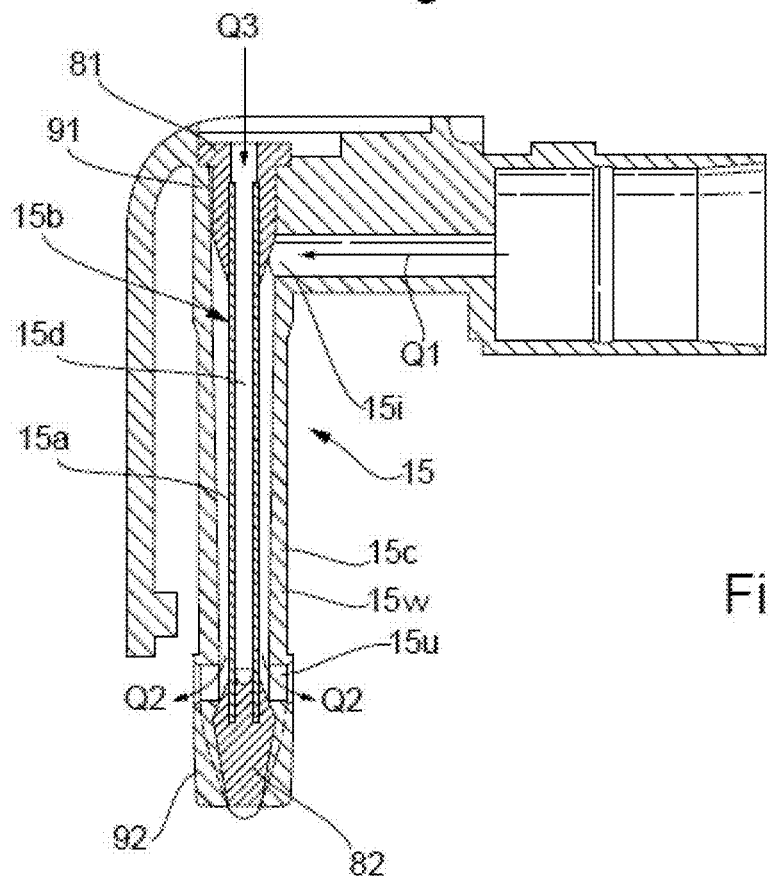
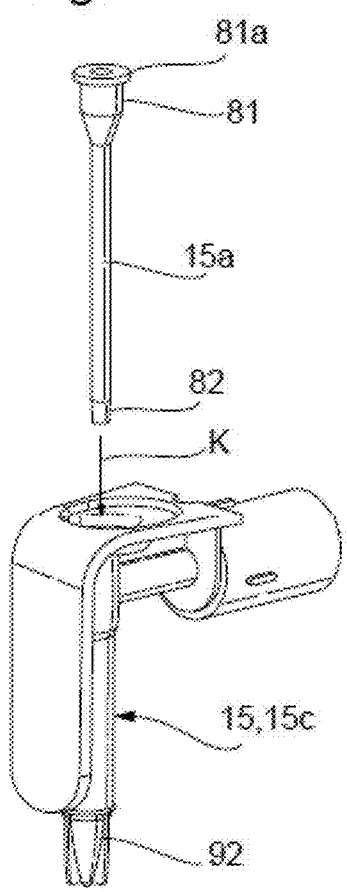

Fig. 9
Fig. 10
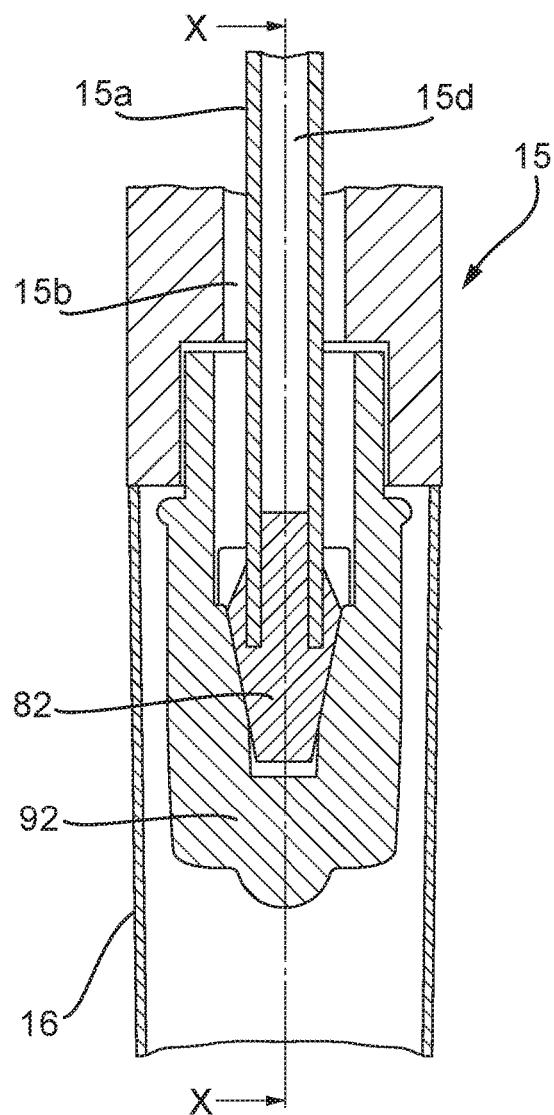
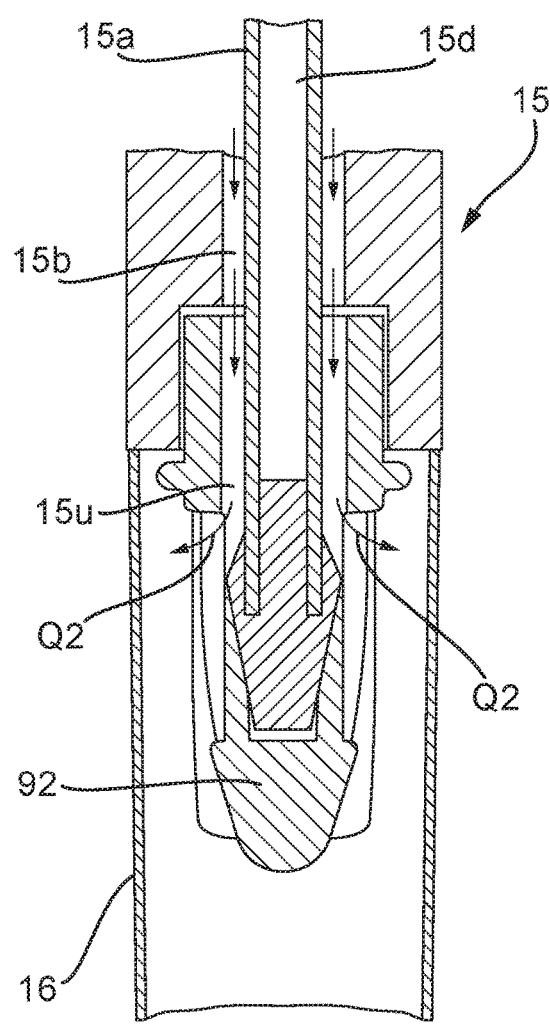

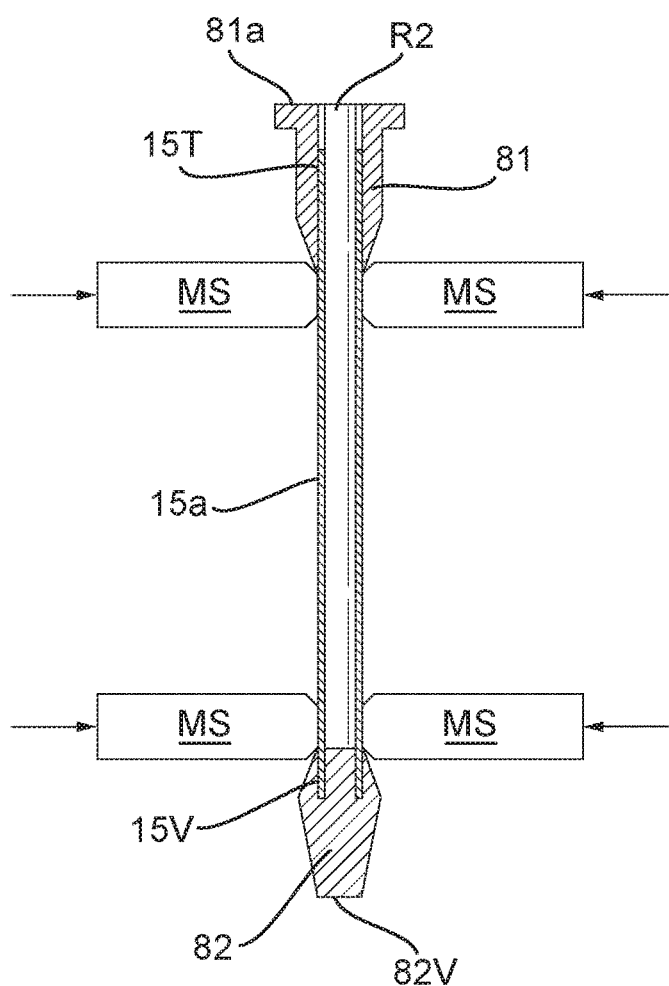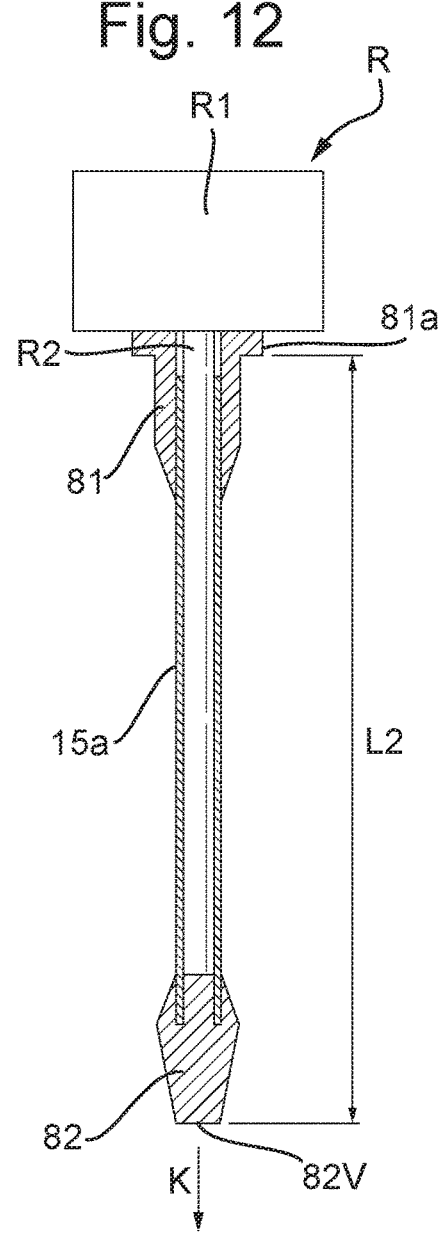

Fig. 17A
Fig. 17B
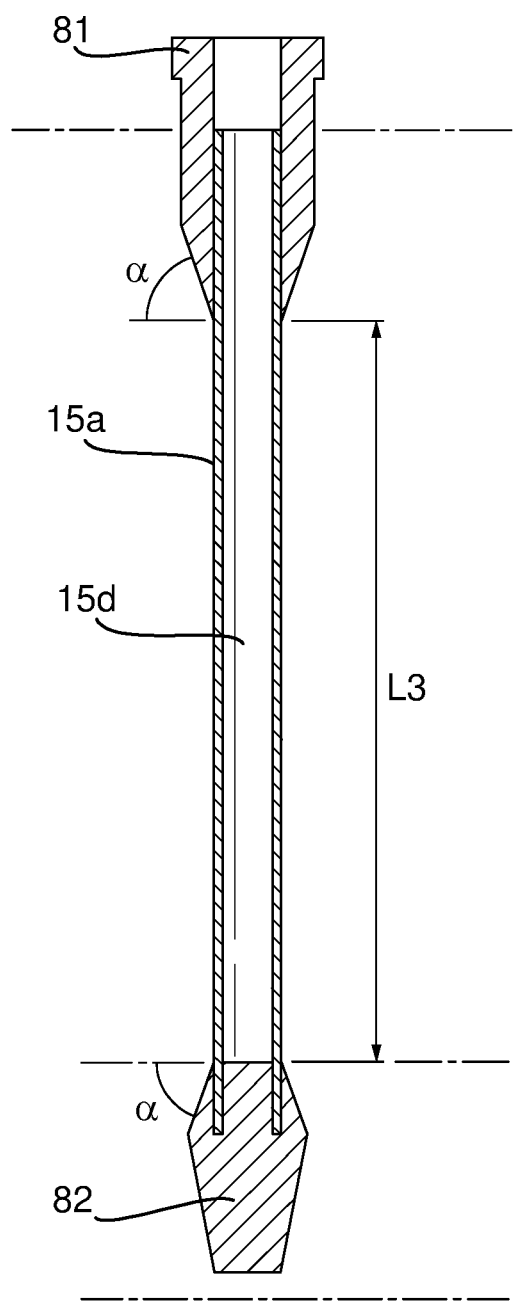
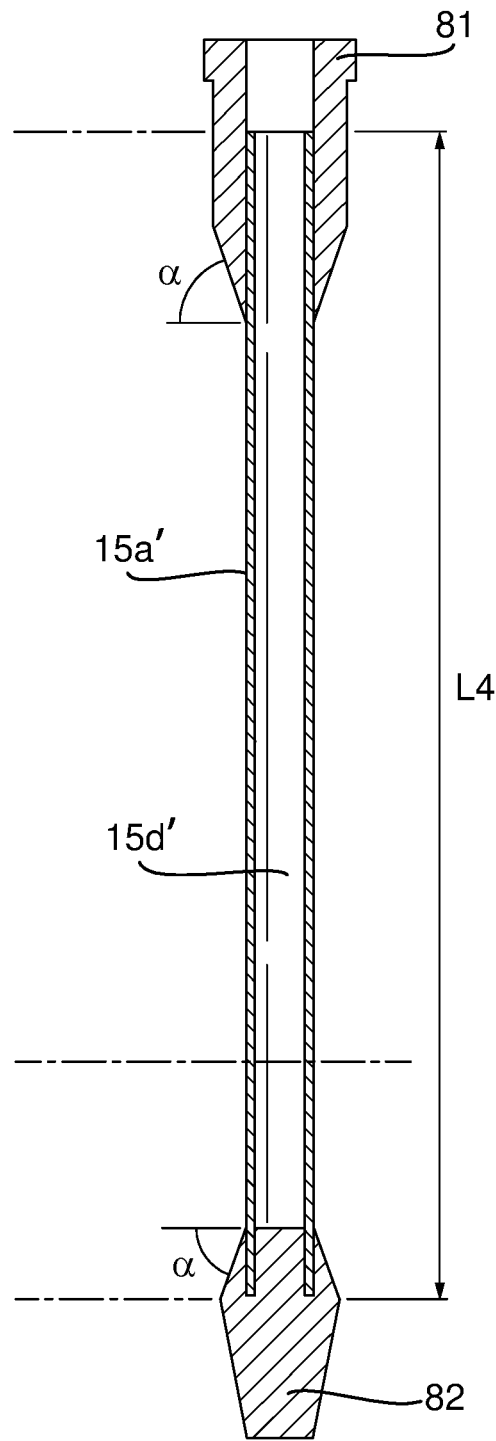

PRODUCT DISPENSING SYSTEM, HOLDER AND MANUFACTURING METHOD

This application claims priority from International Application No. PCT/NL2020/050091, filed on Feb. 18, 2020, which claims priority from European Patent Office application number EP 19158118.0, filed on Feb. 19, 2019, each of which is incorporated herein in its entirety.

TECHNICAL FIELD

The invention relates to a system and corresponding method for dispensing a product, for instance, a milk product, milk, foam, cream or aerated dessert, or a different product.

Such a system is known from practice in various variants. It is known, for instance, to contain a spray cream in an aerosol, which aerosol is manually operable for spraying the cream, see, for instance, European patent application EP 1 061 006 A1.

DESCRIPTION OF THE PRIOR ART

Although highly user-friendly, spray cream is usually of lesser quality than whipped cream. Spray cream is, for instance, less stable than whipped cream: the initial firmness of spray cream is usually lower than that of whipped cream and moreover decreases much more rapidly over time than the firmness of whipped cream. One of the causes of this is the absence of a stabilizing network of fat in spray cream. When making whipped cream, during whipping, a network of linked-together fat globules is formed (also called partial coalescence), which contributes to the stability of the foam. The cream that is used for spray cream is usually desensitized to partial coalescence, so as to prevent partial coalescence occurring already before spraying, as a result of shaking of the aerosol and/or temperature fluctuations (which would lead to clogging of the aerosol). Another cause of the lesser stability of spray cream is the use of, for instance, nitrous oxide for foaming the cream. Use of nitrous oxide is often desirable because the high solubility of nitrous oxide in the cream ensures that, with an acceptable pressure in the spray can, sufficient gas can be stored in the can. The gas thereby dissolved in the product is released upon spraying, resulting in highly aerated foam. In addition, the high solubility of nitrous oxide makes for relatively rapid diffusion of the gas from the foamed product, which results in a lesser stability.

A second drawback of the known spray cream is that the quality of the spray cream during spraying is not constant: for instance, the gas content of the initially sprayed cream is considerably higher than that of the finally sprayed cream, because the nitrous oxide pressure falls during spraying.

Automated whipped cream machines are known per se from practice and are provided with static or dynamic mixers for whipping cream. Advantages of whipped cream over spray cream include a different product quality (lesser aerated quality, higher firmness and better preservation of firmness over time). However, in general, the known whipped cream machines require much time for preparing the foamed product (compared to spray can systems), are less user-friendly (at least, difficultly operable), relatively less hygienic and therefore require frequent cleaning.

An aspect of the present invention concerns in particular a method and system for dispensing a foamed product.

Dutch patent NL1024433 describes a method for obtaining a monodisperse foam, wherein first relatively coarse prefoam is produced, which prefoam is then passed through a membrane. Dutch patent NL1024438 describes another method, in which different steam beams are spouted into a product, for instance, via a beam divider in the form of a membrane.

DE4126397 describes a foam generator, with a mixing chamber and gas inlet chamber which are separated by a porous partition wall, to prepare a building material foam having a short processing time (<30 s).

U.S. Pat. No. 4,674,888 concerns a gas injector, to spray chlorine or oxygen into paper pulp.

JP2005143372 concerns reduction of oxygen in whipped cream, utilizing a porous membrane. FIG. 1 of the document shows a cylindrical body and porous membrane mounted therein.

WO2008/009616 describes different methods for preparing, for instance, ice cream, inter glia agitation of product by means of a rotor and use of membranes.

WO2006/078339 describes a system for obtaining foamed milk, whereby air is supplied to milk via an air hose. Preferably, the hose is provided with a filter to filter impurities from an air stream. Provided behind the filter are valves, to prevent the possibility of hot water flowing to the filter. The mixing of air and milk is done at a distance from the filter, at a hose connector.

Further, PCT/NL2010/050556 discloses a method and system providing significant improvements in dispensing of foamed products.

WO2017/131126 discloses a hollow fiber membrane module for liquid filtration, the module being integrally potted with binding parts into a cylindrical shell.

WO00/74825 shows (in FIG. 11) another example of a filtration unit, in this case including a single substrate tubes potted with epoxy resin into a polyvinylchloride cylindrical shell fitted with 1.25 inch national pipe thread end adapters.

SUMMARY OF THE INVENTION

An aspect of the present invention contemplates a further improved system and method, with which in particular a stable foamed product can be obtained in a particularly efficient manner, with relatively inexpensive, durable and relatively low-energy means, whereby in particular a constant product quality is realized. In particular, the invention aims to provide a system and method for dispensing a non-homogeneously foamed product, for instance, cappuccino milk. Also, the invention aims to provide a system having improved manufacturability, improved durability, at an economical manner.

According to an aspect of the invention this is achieved by the features of claim 1.

Advantageously there is provided a product dispensing system, including a holder which contains a product to be dispensed, the holder being provided with a product processing unit for processing and discharging product coming from the holder, wherein the product processing unit is provided with a microfiltration device which is provided with a product entrance for supply of product, wherein the microfiltration device is connectable to a gas supply for supplying gas to the product during product discharge, wherein the microfiltration device of the product processing unit is provided with a housing defining an interior processing space, wherein the processing space is separated by a tubular microfiltration element, having gas transmissive pores, into a gas supply space from a product feed-through channel, wherein the gas supply space is associated with a gas inlet of the housing and the product feed-through channel is associated with a product entrance of the housing, wherein the housing includes an exit for discharge of product provided with gas, wherein the tubular microfiltration element has an upstream end and a downstream end, wherein the upstream end of the tubular microfiltration element is integrally provided with a first positioning structure which is held by a first holding structure of the housing, wherein the downstream end of the tubular microfiltration element is integrally provided with a second positioning structure which is held by a second holding structure of the housing.

It has been found that in this manner, improved operation of the microfiltration device can be achieved, wherein the microfiltration element can be held firmly via its respective positioning structures by respective holding structures of the housing. Also, in this manner, improved positioning during manufacture/assembly of the microfiltration device can be achieved, allowing relatively swift and accurate positioning of the microfiltration element into the respective housing (being—in particular—a housing or housing part of the respective product processing unit of the product holder). Also, in this manner, improved quality of discharged food-product can be achieved, for long operational periods of the system. The product formed by the invention can moreover provide a particularly pleasant taste/sensorical sensation if the product is intended for consumption. Furthermore, it has been found that a relatively compactly designed microfiltration device, and, for instance, a relatively inexpensive microfiltration device manufactured from disposable material (and/or dishwasher proof material), for example a flexible material, can already effect foam formation with high quality foam.

According to a preferred embodiment, the system includes a dispensing machine, configured for exchangeably receiving the holder, wherein the product processing unit is integral part of the holder, wherein the machine preferably includes means for operating the product processing unit of a placed product holder for discharging product.

The microfiltration device can be designed in various manners. In a preferred embodiment, this device includes a non-rigid, e.g. elastic, tubular filtration element (made e.g. of plastic), to separate a product feed through space (for feeding-through the product) from a gas supply space. The tubular element is preferably provided with a large number of flow-through channels (extending, for instance, transversely through this wall, from the gas supply space to the product feed-through space), which channels are at least provided with relatively narrow outflow mouths (the channels can each also be narrow channels, but this is not requisite). During operation, relatively large pressure differences may prevail between the product feed-through space and gas supply space, for instance, a pressure difference of more than 1 bar or a smaller pressure difference (the pressures mentioned in this application are absolute pressures). The afore-mentioned positioning structures and respective holding structures can achieve stable positioning of the element, allowing for reliable operation.

According to a preferred embodiment, the tubular microfiltration element extends centrally along a center line of the interior processing space of the housing of the microfiltration device, the interior processing space in particular being a substantially cylindrical interior space.

According to a preferred embodiment, the second positioning structure of the tubular microfiltration element is located opposite the product discharge exit of the housing, wherein an outer surface of the second positioning structure facing said exit is configured for directing an incoming product flow towards the exit, in particular along a discharge flow direction that—viewed in cross-section—includes an angle $\alpha 2$ with a lateral direction of the interior processing space of the housing, said angle $\alpha 2$ in particular being in the range of about 10-80 degrees and more preferably being in the range of about 20-60 degrees.

According to an embodiment the second positioning structure is a rotationally symmetrical structure.

Further, the invention provides a holder which contains a product to be dispensed, evidently configured to be a holder of a system according to the invention.

In this way, the abovementioned advantages can be achieved. In particular, the holder can be configured to be exchangeably placed in a dispensing machine (that can also be part of the system), the machine including means for operating the product processing unit of a placed/inserted product holder for discharging product, depending on the configuration of the respective product processing unit. For example, in a further embodiment, the product processing unit of the product holder can include a pumping means for pumping product from the holder to the microfiltration device, wherein the dispensing machine can be configured to drive or operate (e.g. activate) the pumping means of a product holder that is placed in the machine.

Further, an aspect of the invention provides a method for manufacturing a microfiltration device, for example for providing a microfiltration device of a system according the invention, wherein the method includes:

providing a housing defining an interior processing space, wherein the housing has a first holding structure located at or near a first end of the interior processing space, and wherein the housing has a second holding structure located at or near a second end of the interior processing space;

providing a tubular microfiltration element having gas transmissive pores, wherein the tubular microfiltration element has a first end and a second end;

manufacturing a first positioning structure onto the first end of the tubular microfiltration element;

manufacturing a second positioning structure onto the second end of the tubular microfiltration element; and inserting the microfiltration element into the interior processing space of the housing such that its first positioning structure is received by the first holding structure of the housing and such that its a second positioning structure is received by the second holding structure of the housing.

In this way, an improved microfiltration device can be provided leading to the above-mentioned advantages.

BRIEF DESCRIPTION OF THE DRAWINGS

Presently, the invention will be clarified on the basis of an exemplary embodiment and the drawings. In the drawings:

FIG. 5 shows part of the product processing unit of the system of FIGS. 3-4 in cross-section, indicating product crossflows at the exit of the microfiltration device;

FIG. 6 shows a perspective view, exploded, of part of a product processing unit (PPU) housing and respective tubular microfiltration element;

FIG. 9 shows detail Q of FIG. 4;

FIG. 10 is a cross-section over line X-X of FIG. 9;

FIG. 11 schematically depicts part of a manufacturing method for manufacturing the positioning structures of the tubular microfiltration element of the system;

FIG. 12 schematically depicts operation of an assembly tool for handling the tubular microfiltration element;

FIG. 17A is similar to FIG. 7, showing a further embodiment of the tubular microfiltration element in an initial unstrained state; and FIG. 17B shows the embodiment of FIG. 17A in an axially expanded mounting state.

DETAILED DESCRIPTION OF THE INVENTION

Figure 1:
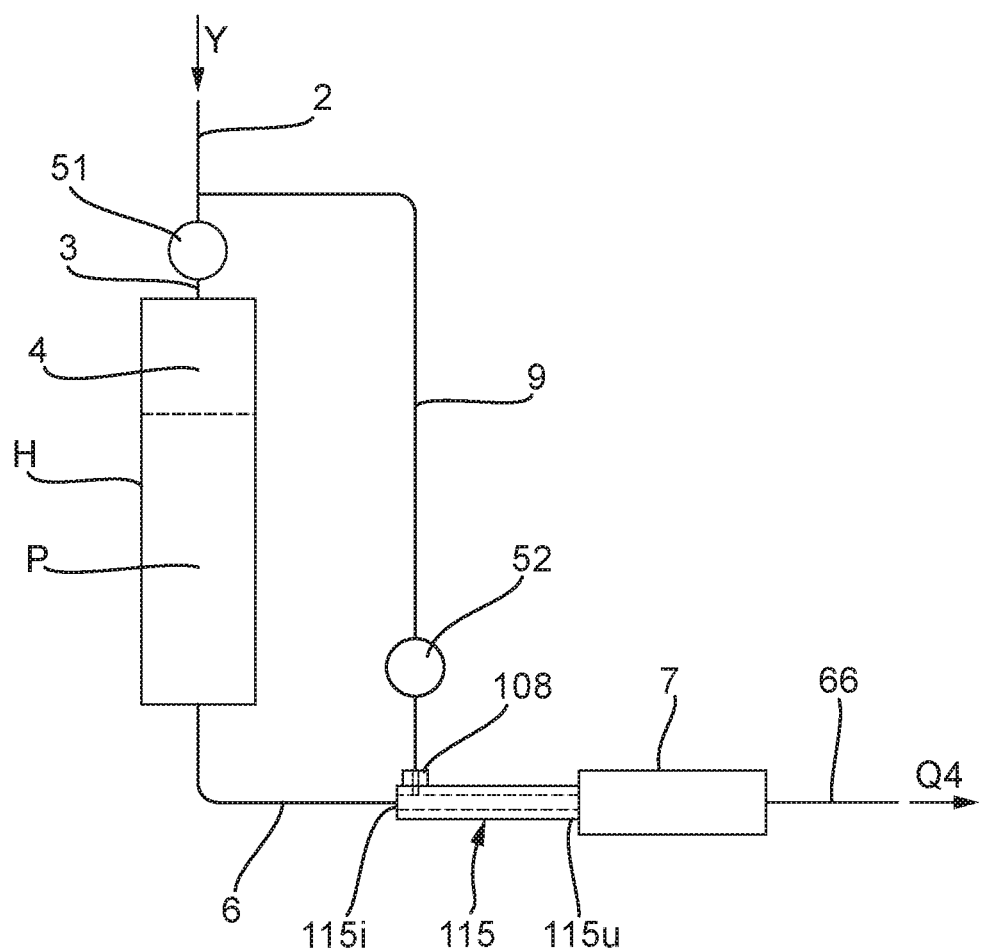
FIG. 1 shows a schematic view of a number of base components of a product dispensing system.

In this application, identical or corresponding features are indicated with identical or corresponding reference numerals.

FIG. 1 schematically shows an example of a product dispensing system, described per se in PCT/NL2010/050556 (incorporated by reference in its entirety in the present patent application), the system comprising a holder H which contains a product P to be dispensed, and product discharge means 6 (for instance, provided with a product discharge channel) for discharging product P coming from the holder H. A system corresponding or similar to that of FIG. 1 may be utilized, for instance, in a dispensing system as will be described below, in which case the product processing means are integrated with the holder as a "product processing unit PPU" (as in the system of FIGS. 3-10).

The holder H can be designed and formed in different manners. For instance, an outer wall of the holder H can be manufactured from, for instance, metal, an alloy, plastic, or the like. The outer wall can be of rigid or flexible design. The holder H may be, for instance, of cylindrical or angular design, or of different design. In a preferred embodiment, the holder is a bag-in-box type holder, wherein the product is held in a flexible bag that is located within an external enclosure (box), as in FIG. 3.

The holder H can be designed, for instance, to withstand a maximum internal pressure of 12 bar, in particular 10 bar, for instance, if the holder H is provided with a propellant (see hereinbelow). According to an advantageous embodiment, the holder H is designed to withstand a considerably lower maximum pressure, for instance, at most 2 bar, so that the holder can be of relatively light (and, for instance, relatively simple, inexpensive) design (such as the bag-in-box design).

According to an advantageous elaboration, the product P present in the holder is a homogeneously foamable product, and in particular a food product, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, juice, more particularly a milk product. The product P can be, for instance, cream.

The product can be e.g. a mixture of products, for example of a mixture of a number of the afore-mentioned products, a mixture of one of the aforementioned products with a liquid (e.g. water), a mixture of a concentrated product (e.g. concentrated milk) and a liquid (e.g. water), or a different mixture. In order to obtain such a mixture, various product holders may be available for providing respective products to be mixed, before being fed to a downstream part of the system (i.e. to the product discharge means 6). Alternatively, for example, the system can include a product holder H as well as include one or more liquid supplies (e.g. a water supply 101) for achieving a product/liquid-mixture (as in the system of FIGS. 3-6), to be fed to the discharge means.

The product P can optionally contain, for instance, a propellant or blowing agent (for instance, in a condition at least partly dissolved in the product), in particular a propellant consisting of one or more of: air, N2, N2O and/or CO2. Such a propellant or blowing agent is, in particular, safe with regard to food technology. The propellant or blowing agent can hold the inner space 4, for instance, at a particular superatmospheric prepressure.

Furthermore, the product P may comprise, for instance, no homogeneously foamable and/or consumable product P.

As shown in FIG. 1, the product discharge means 6 are advantageously provided with a microfiltration device 115, which is, for instance, connectable (via a gas inlet 108) to a gas supply 9 for supplying gas to the product during product discharge. The microfiltration device 115 is furthermore provided with a product entrance 115i for receiving (not yet foamed) product P (for instance, a product P not yet containing gas) coming from the holder H and discharge 6.

The system shown in FIG. 1 can further be provided with, for instance, regulating means 51, 52, for instance, one or more operating valves, operating buttons and/or the like, for regulating gas supply and/or gas pressure, which will be clear to the skilled person. Operable valve means may be provided, for instance, for regulating gas supply (or gas pressure) to the holder H. Operable valve means may be provided, for instance, for regulating gas supply (or gas pressure) to the microfiltration device 15.

In FIG. 1, an optional product processing device, in this example comprising a mixing device 7, is disposed downstream of the microfiltration device 15 for performing a mixing treatment on the product provided with gas. More particularly, the mixing device is a static mixer 7. The product processing device can also be designed otherwise. Preferably, this device is designed to enable controlled (in particular, gradual) reduction of the excess pressure of the product from, for instance, a superatmospheric pressure to a lower, substantially atmospheric pressure.

In case of discharging certain products, such as e.g. cappuccino milk, application of the additional product processing device 7 is not required.

Figure 2:
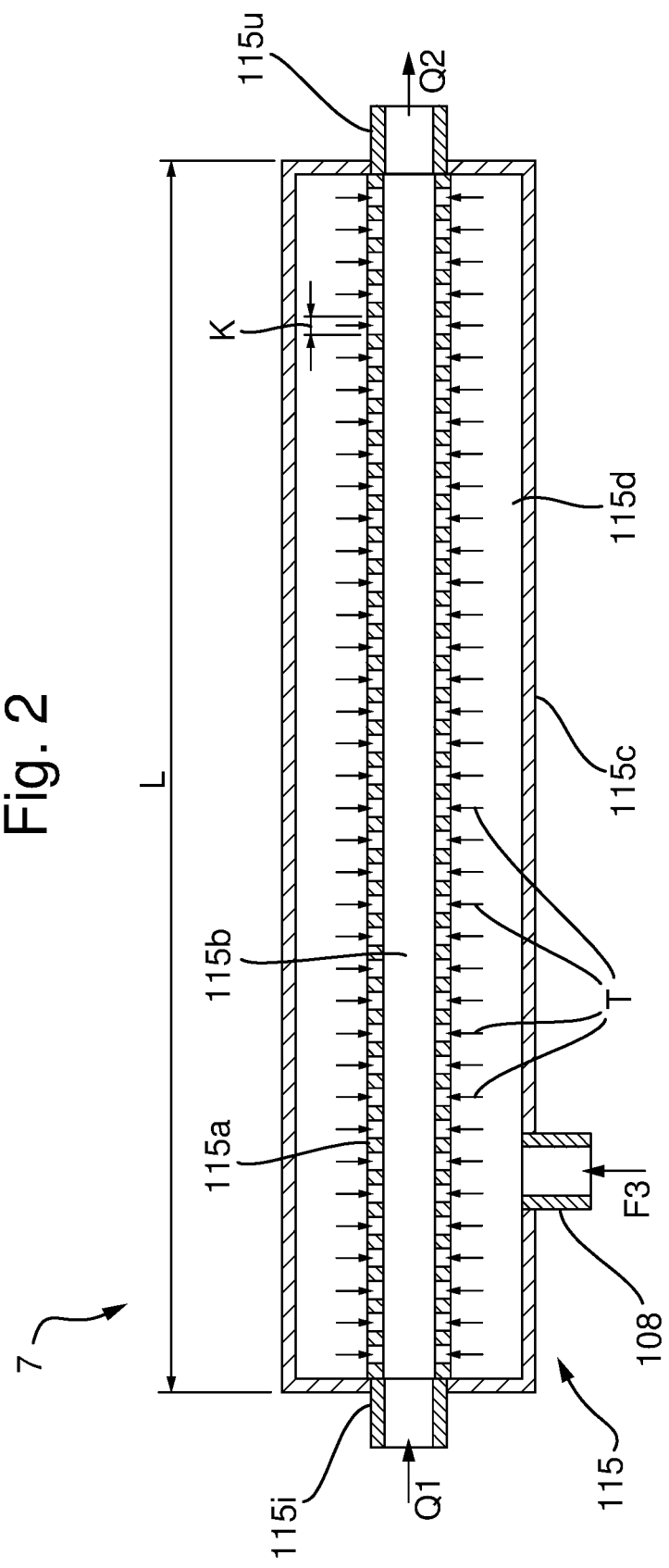
FIG. 2 schematically shows an example of a microfiltration device of the system of FIG. 1.

FIG. 2 shows a further, non-limiting elaboration of the microfiltration device 115 in more detail.

The microfiltration device 115 is provided, for instance, with a (substantially closed) housing 115c comprising a product entrance 115i for supply of product P, a gas inlet 108 for supply of gas, and an exit 115u for discharge of product provided with gas. The gas inlet 108 terminates, for instance, in a gas receiving space 115d (i.e., a second space 115d) which is separated from the product entrance 115i and exit 115u by means of a microfiltration wall 115a (provided with gas transmissive pores). In a preferred embodiment, the microfiltration wall 115a is provided by a flexible tubular element (as is explained below). Furthermore, the wall 115a separates the gas supply space 115d from a product feed-through channel 115b (i.e., a first space 115b). The feed-through channel 115b extends between the product entrance 115i and product exit 115u (in the housing 115c) of the microfiltration device 115. Supply and discharge of product to/from the channel 115b is indicated with arrows Q1, Q2, respectively.

As mentioned, the microfiltration device 115 can be designed in various manners. In one embodiment, the filtration wall can be so rigid that the wall does not deform under the influence of a pressure difference prevailing, during use, between the product feed-through space 115b and gas supply space 115d, for instance, a pressure difference of more than 1 bar. Still, the filtration wall 115a as such can have some resiliency or elasticity, for example in case it is made of certain plastic material(s).

In the exemplary embodiment, the product feed-through channel 115b is in the microfiltration wall 115a (at least, is surrounded by that wall) and the gas supply space 115d is outside thereof. Alternatively, as in the system of FIGS. 3-10, the product feed-through channel 115b is outside the microfiltration wall 115a, while the gas supply space 115d is formed by the space surrounded by this wall 115a.

The microfiltration wall 115a is, for instance, cylindrical, tubular, with, for instance, a circular cross section. According to a further elaboration, a length L of the wall 115a (in particular, of the channel 115b) is at most 50 cm, in particular at most 20 cm, more particularly at most approximately 10 cm. This length L is, for instance, in the range of approximately 1-20 cm (a minimum length is, for instance, approximately 0.5 cm). In a relatively compact design, this length L is less than 5 cm, for instance, a length of approximately 0.5, 1, 2, 3, or 4 cm. The length L is, in particular, the length of the wall 115a measured in a product flow direction of product during use flowing along this wall (parallel to this wall 115a), from the product entrance 115i to the product exit 115u. The filtration device 115 (for instance, microfiltration wall 115a) can also be dimensioned and shaped differently, for instance, flat, curved, conical, angular, straight, convex viewed from the first space, concave viewed from the first space, and/or a combination of these or other shapes, and for example having a length over more than 20 cm, for example at least 100 cm. A morphology of the wall 115a may be, for instance, homogeneous, sintered, cylindrically porous or spongy porous, built up symmetrically or asymmetrically, built up from several different layers, may comprise a combination of these configurations or be designed in a different manner.

The microfiltration wall 115a may in itself be manufactured from different materials, for instance, ceramic material, metal, plastic, polypropylene, polyolefin, a blend, an alloy or the like.

The microfiltration wall 115a is preferably provided with relatively narrow air transmissive pores (for instance, air transmissive outflow channels, injection channels, with gas outflow ends that terminate in the feed-through channel 115b), in particular having a pore dimension K (in particular, pore size, measured at right angles to a pore flow-through direction; for instance, a pore diameter, see FIG. 2) in the range of 0.1-10 microns, in particular in the range of approximately 0.1-2 microns (for instance, 0.1-1 micron). Good results are obtained if the pore size (or channel cross dimension) is in the range of approximately 0.1-0.5 micron, in particular 0.2-0.8 micron, and is, for instance, approximately 0.5 micron. Also, good results are obtained with a pore size in the range of approx. 0.2-1.5 microns, for instance, approx. 1.4 microns, for instance, for a non-homogeneously foamed product, for instance, cappuccino milk.

This pore size/channel cross dimension K is in particular at least the size of a downstream part of the respective pore (outflow channel), for instance, an outflow end thereof (which end bounds the product feed-through channel 115b); a part of the pore upstream relative to the pore outflow end can, for instance, have the same pore size (for instance, diameter) as the outflow end, or a greater one.

The pores (outflow channels) in the wall 115a can, for instance, all have substantially the same pore size, or different sizes that are in a predetermined pore size range, which will be clear to the skilled person. A pore size value can be, for instance, a pore size range comprising the value mentioned minus 50% (in particular 10%) up to the value plus 50% (in particular 10%).

A wall thickness of the microfiltration wall 115a can be, for instance, smaller than 1 cm, and is, for instance, in the range of 0.1-5 mm, in particular, for instance, 0.5-2 mm. According to a non-limiting example, if the device 115 is tubular, a tube outer diameter of this filtration device 115 can be, for instance, smaller than 10 cm, for instance, smaller than 1 cm.

A cumulative pore surface of the pores in a surface of the wall 115a bounding the product feed-through channel 115b is, for instance, smaller than a remaining, closed part of this surface. In this wall surface the pores may further, for instance, be so distributed over the surface that circumferential edges of neighboring pores are, for instance, at a mutual distance from each other that is greater than a pore dimension K mentioned. A ratio between average pore size and average least neighbor distance (between neighboring pores) may be, for instance, in the range of approximately 1:1-1:50, in particular 1:2-1:20, or other ratio.

A cumulative pore surface of the pores in a surface of the wall 115a bounding the product feed-through channel 115b is, for instance, greater than a remaining, closed part of this surface. In this wall surface the pores may further, for instance, be so distributed over the surface that circumferential edges of neighboring pores are, for instance, at a mutual distance from each other that is smaller than a pore dimension K mentioned. A ratio between average pore size and average least neighbor distance (between neighboring pores) may be, for instance, in the range of approximately 10:1-1:1, in particular 5:1-1:1, or other ratio.

Preferably, the pores are relatively uniformly distributed over the wall 15a, in a regular arrangement or not so.

Preferably, the microfiltration wall 115a is, preferably concentrically, arranged in a hollow housing 115c of the filtration device 115 (see FIG. 2), which housing is provided with the gas inlet 108. Between an inside of the housing 115c and an outside of the (in this case) tubular microfiltration wall 115a is the interspace 115d for collecting air supplied via inlet 8.

During use, the air present in the interspace 115d may be a pressure higher than 2 bar, in particular higher than 5 bar, more particularly a pressure higher than 7 or 8 bar, for instance, a pressure in the range of 8-15 bar. The pressure of product present during use in the flow-through space 115b is, in particular, lower than the pressure in the interspace 115d (for instance, at least 1 bar lower, or a lower pressure difference, for instance, a pressure difference greater than 0 bar and less than 1 bar), such that air present in the interspace 115d enters the product uniformly via the pores (which is indicated with arrows T). In this manner, fine air bubbles can be homogeneously introduced into the product P, for the purpose of foam formation.

The optional static mixer 7 can be designed in different manners. The static mixer is, in particular, not provided with moving parts, this in contrast to, for instance, a disperser provided with moving parts, such as a turrax or rotor-stator mixer.

In particular, the system is provided with or is connectable to a gas supply for supplying gas under superatmospheric pressure to the microfiltration device 115, and preferably also to the holder H. Gas supply to the system is indicated in FIG. 1 with an arrow Y. Pumping means (for instance, with a compressor 52) and/or a gas reservoir brought to excess pressure (for instance, a gas cylinder) may be provided, for instance, to effect gas supply. The system can comprise, for instance, regulating means 51, 52 for regulating flow rates and/or pressure of gas to be supplied to the holder H and filtration device 115. In the system shown in FIG. 1, the supply comprises, for instance, a supply line system 2, provided with a line part that, during use, is connected to a suitable gas inlet 3 of the holder H, and a line part that, during use, is connected to a filtration device 15, for supplying gas thereto. The gas may comprise, for instance, one or more gases, a gas mixture, nitrogen, air or the like.

Optionally, the holder H is provided with a pressure release valve (not represented) for rendering a pressurized holder H pressureless, or for allowing entry of air into the holder during product discharge (avoiding that the interior of the holder draws a vacuum).

The present exemplary embodiment of FIG. 1 is designed to supply the same gas to the holder H and filtration device 115. Alternatively, gas supply means can be designed, for instance, to supply a first gas to the holder and a second gas, different from the first gas, to the filtration device 115.

Alternatively, the system may for instance be designed in a different manner to effect product flow, for instance, by providing the system with pumping means to pump product P from the holder H through the discharge. As is explained below, the holder itself can include a pumping means, or be associated with a pumping means for pumping product from the holder. For example, a jet pump can be applied to extract product during operation, wherein the pump can e.g. be fluid-jet-driven or the-like as will be clear to the skilled person. The operation of jet-pumps as such, e.g. based on Cunningham's theory, is commonly known (see e.g. the theory derived by Cunningham, published in the "Pump Handbook" section 4.1, Karassik I. J., Messina J. P., Cooper P., and Heald C. C., New York: McGraw-Hill; 2007, 3 edition).

Use of the system shown in FIGS. 1-2 comprises, for instance, a method for dispensing the product P coming from the holder H (for instance, a substantially gasless product), with gas being supplied to the product P (flowing through the feed-through channel 115b) via the microfiltration device 115. In particular, microfiltration device 115 is operative to inject the gas into the product P supplied to that device.

Preferably, the product P which is supplied to the filtration device is not heated. The product may, for instance, be cooled (for example, to a temperature that is lower than a holder ambient temperature), or have an ambient temperature. In another example, the product P which is supplied to the filtration device is heated (for instance, to a temperature that is higher than the temperature at which the product has been stored, for instance, a cold store temperature or a temperature that is higher than a holder ambient temperature).

The temperature of the gas (or gas mixture) to be supplied to the filtration device can be, for instance, an ambient temperature, for instance, room temperature. The gas temperature can be, for instance, in the range of 0-50 degrees C., or another temperature, for instance, a temperature higher than 50° C. or, conversely, a temperature of 0° C., or lower than 0° C.

Here, the product P, in itself preferably not yet foamed, is passed out of the holder H, for instance, under the influence of gas supplied via the supply 2, to be conducted via the discharge 6 through the filtration device 115 and then through the mixer 7. Here, the product is passed, in particular, through the tube inner space (i.e., feed-through channel) 15b of the microfiltration device 115 (with the product flowing along the filtration wall 115a), while gas from the gas supply space 115d is injected via the microfiltration wall 115a (at least, through the wall) into the product for the purpose of bubble formation in the product (to that end, the gas is supplied from the gas supply space 115d to the pores). A pressure prevailing in the gas supply space 115d is, for instance, higher than a pressure of the product P flowing along the filtration wall 115a. A flow rate of the product flowing through the filter 115 can be, for instance, higher than 10 liter/hour, and be in the range of, for instance, approximately 20-200 liter/hour (for instance, 20-50 liter/hour), or other range.

Good results are obtained if the gas is introduced via the filtration device 115 into the product P under the influence of a pressure of more than 2 bar, for instance, a pressure in the range of higher than 5 bar, in particular a pressure higher than 7 or 8 bar, for instance, a pressure in the range of approximately 8-15 bar. A flow rate of the gas may be, for instance, greater than 10 liters per hour, and may be, for instance, in the range of approximately 30-600 liter/hour (for instance, 50-300 liter/hour and more particularly 100-300 liter/hour), or have a different value. The ratio of product flow rate to gas flow rate can be, for instance, in the range of 10:1-1:10, in particular 1:1-1:5, for instance, 1:1.5-1:5, in particular 5:1-2:1, or other ratio.

Thereupon (i.e., downstream of the microfiltration device 115) the product P may undergo an optional mixing treatment, which is performed by the static mixing device 7. It has been found that the product coming from the mixer 7 (product outflow via an optional outflow line 66 is indicated in FIG. 1 with arrow Q4) can contain a particularly durable, stable foam, which may, for instance, be foamed particularly homogeneously if the product in itself is a foamable product. Moreover, the system can be made of particularly compact, durable and relatively simple design to obtain such a result.

Figure 3:
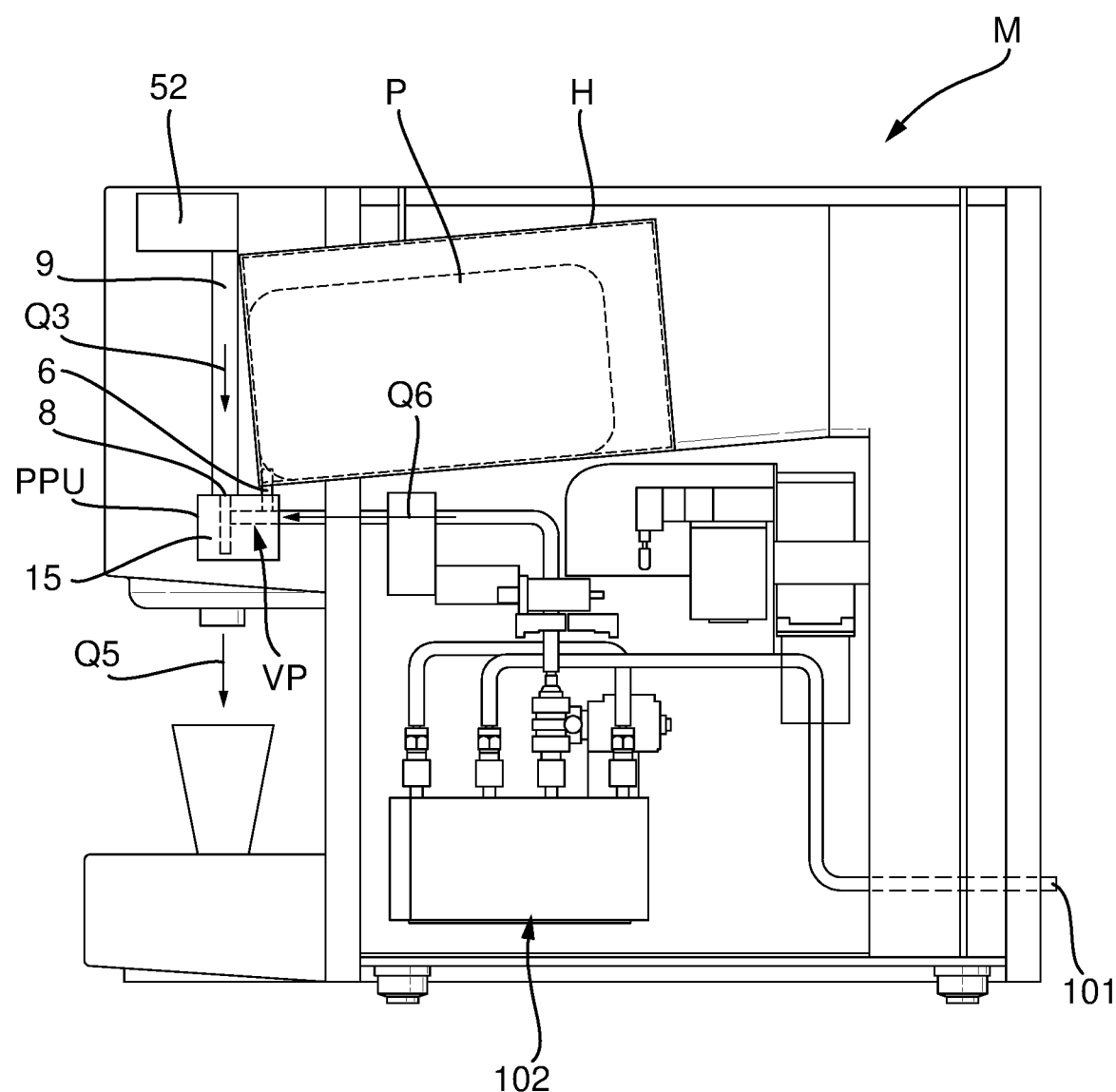
FIG. 3 shows a partly opened side view of a product dispensing system according to a non-limiting embodiment of the invention, schematically showing a placed product container and fluid flow paths.

FIG. 3 depicts a product dispensing system according to an example of the present invention. The system differs from the system shown in FIGS. 1-2 in that it includes a dispensing machine M, configured for receiving an exchangeable product holder H. In this example, the product holder H is a bag-in-box type holder, wherein the product P is held within a flexible bag located within a box H. The dispensing machine M includes e.g. a product holder receiving bay for receiving and holding the holder H in the depicted operating position.

The holder H includes a product outlet 6, for feeding product P from the bag to a downstream product processing unit PPU. The product processing unit PPU of the holder H is depicted in more detail in FIGS. 4 and 5. The processing unit PPU can be integrally connected to the respective product holder H, in particular to be installed and (after use) removed from the machine M together with the product holder H.

The product processing unit PPU is configured for processing and discharging product coming from the holder H, in particular for injecting gas into the product P.

To this aim, the product processing unit PPU is provided with a microfiltration device 15 which is provided with a product entrance for supply of product P, wherein the microfiltration device 15 is connectable to a gas supply 9, 52 of the machine M, for supplying gas (under superatmospheric pressure) to the product during product discharge. As follows from FIG. 3, the gas supply can e.g. include an air compressor 52 (or different type of gas supply) which is in fluid communication with a gas inlet 8 of the microfiltration device 15 when the product holder H is in its operating position in the machine M. The gas flow towards the microfiltration device 15 is indicated by arrow Q3.

As in the example of FIGS. 1-2, the microfiltration device is provided with a housing 15c defining an interior processing space. In the present embodiment, the processing space is separated by a tubular microfiltration element 15a, having gas transmissive pores, into a gas supply space 15d from a product feed-through channel 15b. The gas supply space 15d is associated with the gas inlet 8 of the housing and the product feed-through channel 15b is associated with a product entrance 15i of the housing, wherein the housing 15c includes an exit 15u for discharge of product provided with gas (see FIGS. 4-5). It should be observed that, in order to increase throughput, the processing unit PPU of the holder H may include more than one microfiltration device 15, e.g. two, wherein such a plurality of microfiltration devices 15 may be arranged in parallel.

Advantageously, the tubular microfiltration element 15a is provided with two integrally fixed positioning structures 81, 82 (see in particular FIG. 7), explained in more detail below. Preferably, a length L1 of the product feed-through channel 15b measured in a product flow direction, and measured between opposite ends of the first and second positioning structure 81, 82, is at most 10 cm. Good results can be achieved in case this length L1 is at most 5 cm, and more particularly is in the range of approximately 0.5-5 cm, for instance, approximately 3 cm.

Further, preferably, the wall of the tubular microfiltration element has gas transmissive pores having a pore size in the range of 0.1-10 microns, in particular a pore size of at least 0.1 micron and less than 2 microns, more particularly a pore size of at least 0.2 micron and less than 1.5 microns.

Figure 4:
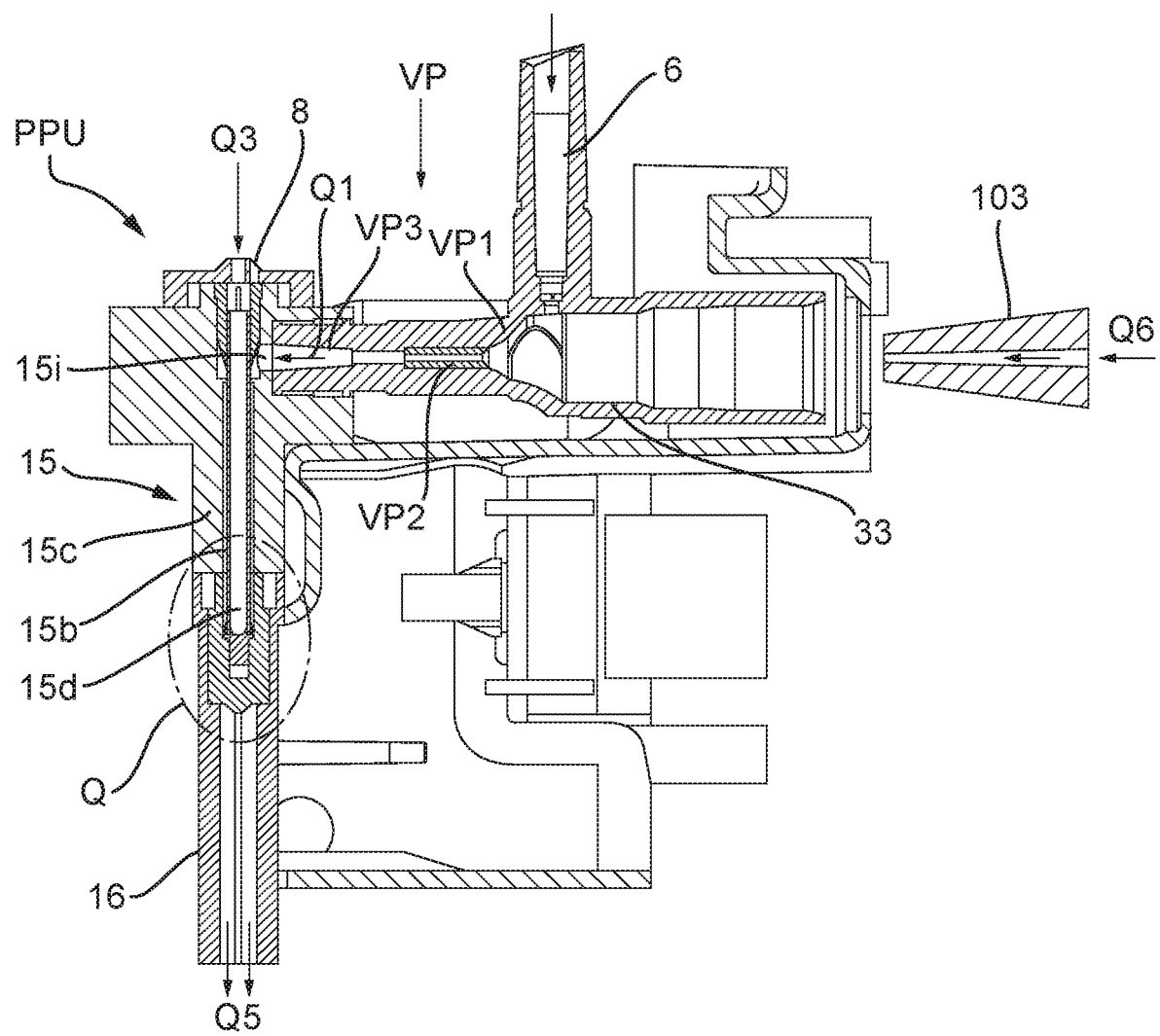
FIG. 4 shows a vertical cross-section of a product processing unit of a product holder of the system shown in FIG. 3.
Figure 7:
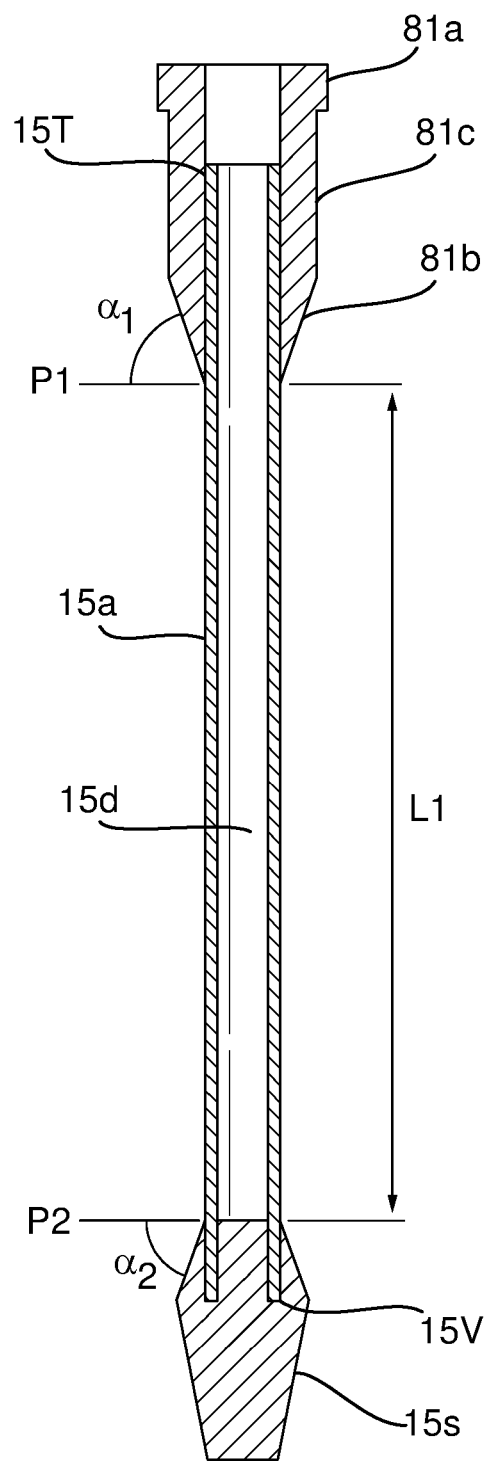
FIG. 7 depicts a vertical cross-section of a tubular microfiltration element of the system of FIGS. 3-4.
Figure 8:
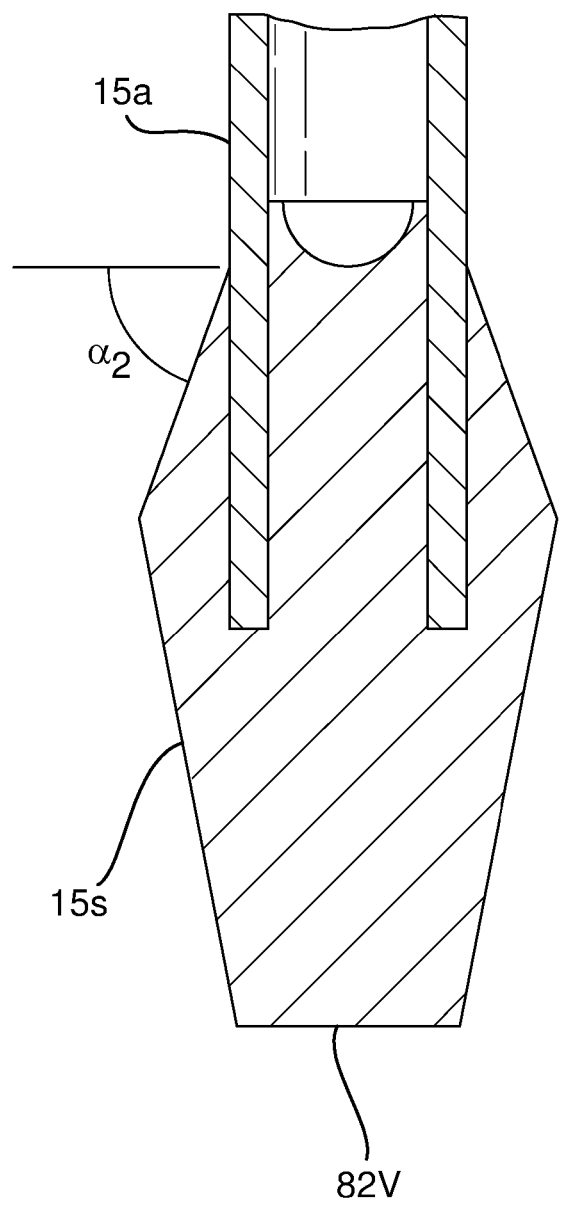
FIG. 8 shows a detail of a lower end of the tubular microfiltration element of FIG. 7.

As follows from FIG. 4, the present product processing unit PPU of the product holder includes a jet pump VP, for pumping product from the product holder H to the product entrance of the microfiltration device 15, the jet pump in particular using hot water as a pumping medium. The jet pump VP can include e.g. a water jet injector 103, a converging inlet nozzle VP1, a downstream throat VP) and a further downstream diverging outlet diffuser VP3. More particularly, the dispensing machine M includes a liquid supply for supplying a liquid to the product P, upstream of the product entrance of the microfiltration device, the liquid in this example being water, preferably hot water. To this aim, the dispensing machine M can e.g. be connected or connectable to a tap water connection 101 (see FIG. 3) for receiving (e.g. cold) water, wherein the dispensing machine M includes a water heating device 102 for heating incoming tap water to a desired or predetermined processing temperature. The dispensing machine M further includes said water injector 103 downstream of the optional heating device 102, for injecting the water (preferably heated by the heating device)—e.g. as a high velocity water pumping jet Q6—towards the downstream microfiltration device 15 (via the jet pump sections VP1, VP2, VP3). The water injector 103 can e.g. be part of a valve member of the dispensing machine M, which valve member may connect to a respective valve seat 33 that can be part of the product processing unit PPU of the product holder H, when the product holder H has been properly positioned in the machine M. The water injector (valve) 103 may e.g. have a closed valve position with respect to the valve seat 33, in which it closes the product exit 6 of the product holding bag, and a release position in which it separated from the product exit 6 to allow product discharge from the bag. The machine M can e.g. include a valve actuator for adjusting the position of the water injector 103 with respect to its valve seat 33.

During operation, the pumping water jet Q6 entrains product P from the product holder's bag by momentum via the product exit 6, the product P being mixed into the pumping water jet to be injected into the downstream product feed-through channel 15b of the processing unit PPU. Thus, the water not only acts as a pumping medium for drawing product P from the holder H, it can also serve to dilute the product P to a desired composition/concentration which is in particular, advantageous in case the product, held in the bag, is a concentrated product (e.g. a milk concentrate). It should be noted that in the present example, product P discharge from the holder H can be achieved mainly via pumping action of the jet pump, or be achieved via jet pump action plus additional—optional—pumping means (e.g. means for pressurizing the product holding bag) and/or gravity. For example, in order to improve a gravity assisted discharge of the product P, the product holder H (and respective product containing bag) can be held at a tilted orientation in the machine M, such that a respective outflow channel 6 is located at a relatively low or lowest point, as in FIG. 3.

As follows from FIGS. 3-5, during operation, product P that is pumped out of the holder H, mixed with pumping water, is processed by the processing unit PPU, the product/water flow being indicated by arrow Q1, wherein gas is injected into the product/water-mixture (gas flow Q3) via the tubular microfiltration element 15a. The resulting processed product leaves the microfiltration device via the respective exit in this case, a plurality of exits 15u is available, see FIG. 5), as indicated by arrows Q2. In this example, the processed product is collected downstream of the microfiltration device 15 by a collector 16 (see FIG. 4), configured to collect and discharge the processed product P via an outlet as is indicated by arrow Q5 (to be received in a product receiver such as e.g. a cup placed below the outlet of the collector).

As follows from the drawings, the tubular microfiltration element 15a extends centrally along a center line of the interior processing space of the housing 15c of the microfiltration device 15. Also, the interior processing space is—in particular—a substantially cylindrical interior space.

As follows from FIG. 6, assembly of the microfiltration device can include inserting the microfiltration element 15a into the processing space defined in the housing 15c (the inserting being indicated by an arrow K). The inserting can e.g. be achieved using a mobile positioning tool R (an example being shown in FIG. 12), having a tool head R1 and a tool pin R2, the tool pin R2 protruding into the tubular microfiltration element 15a.

After the assembly, the tubular microfiltration element 15a extends centrally along a center line of the interior processing space of the housing 15c of the microfiltration device 15, the interior processing space in particular being a substantially cylindrical interior space.

Proper, precise and stable positioning of the microfiltration element 15a within the processing space during the assembly, allowing a constant environment for product processing and a resulting constant high quality of processed product, is achieved by accurate positioning of the tubular element at both ends. In particular, to this aim, the tubular microfiltration element 15a has an upstream end 15T and a downstream end 15V, wherein the upstream end 15T of the tubular microfiltration element 15a is integrally provided with a first positioning structure 81 which is held by a first holding structure 91 of the housing 15c, wherein the downstream end 15V of the tubular microfiltration element 15a is integrally provided with a second positioning structure 82 which (after assembly) is held by a second holding structure 92 of the housing 15c.

Preferably, each of the first and second positioning structures 81, 82 are made of rigid material, for example a rigid plastic or rigid plastic compound. The tubular microfiltration element 15a is preferably made of a flexible, at least partly elastic material, for example mainly consisting of polypropylene. More particularly, a modulus of elasticity of the material of the positioning structures 81, 82 can be significantly higher that a modulus of elasticity of the material of the intermediate tubular microfiltration element 15a.

As follows from the drawings, the first holding structure 91 of the housing 15c of the microfiltration device (i.e. of the processing unit PPU) can e.g. include a rigid, ring shaped upper edge, configured for supporting an upper flange 81a of the first positioning structure 81. More particularly, the first positioning structure 81 can be a rotationally symmetrical structure (with respect to a center axis of the tubular microfiltration element 15a), enclosing the upper end of the element 15a. The first positioning structure 81 is configured to maintain a respective upstream end of tubular microfiltration element 15a open for fluid entry into that element. Further, it has a tapered section 81b and an optional intermediate section 81c of constant external diameter extending between the tapered section 81b and the upper flange 81a. Preferably, the external diameter of the intermediate section 81c of the first positioning structure 81 is the same as an inner diameter of the respective upper section of the interior processing space of the microfiltration device 15, allowing a sealing (preferably airtight) fit there-between.

In the example, the tapered section 81b of the first positioning structure extends along a substantially conical plane. As follows from FIG. 7, viewed in cross-section, the outer surface of the tapered section 81b includes an angle α1 with respect to a lateral plane P1 that is smaller than 90 degrees, for example an angle α1 in the range of 20-80 degrees, more particularly an angle α1 in the range of 45-70 degrees. After assembly, in the present embodiment, the tapered part of the first positioning structure 81 is located opposite the product inlet 15i of the respective microfiltration device (see FIG. 4, 5). Thus, the external surface of the first positioning structure 81 can act as a flow redirector, for receiving and redirecting incoming product flow into the downstream (cylindrical) product feedthrough channel 15b of the microfiltration device 15.

Figure 13:
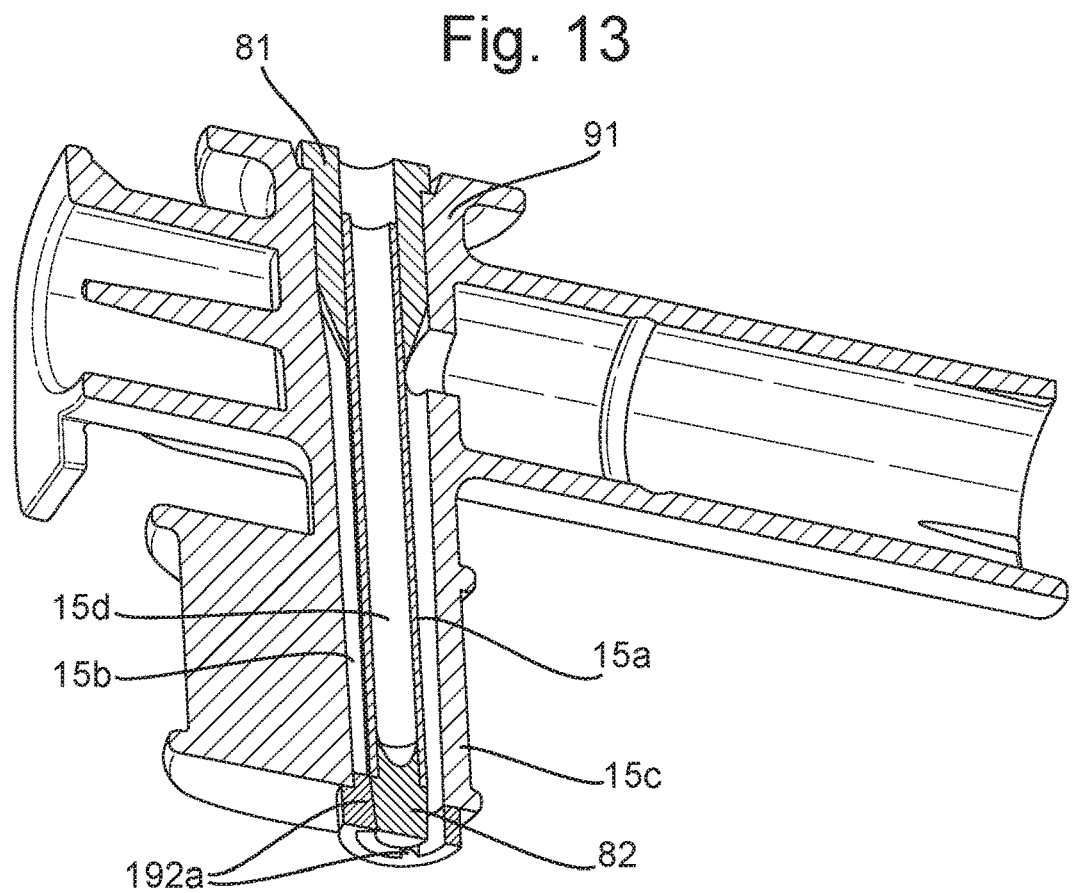
FIG. 13 is similar to FIG. 5, showing part of the product processing unit having a further embodiment of the second holding structure, in perspective cross-section.
Figure 14:
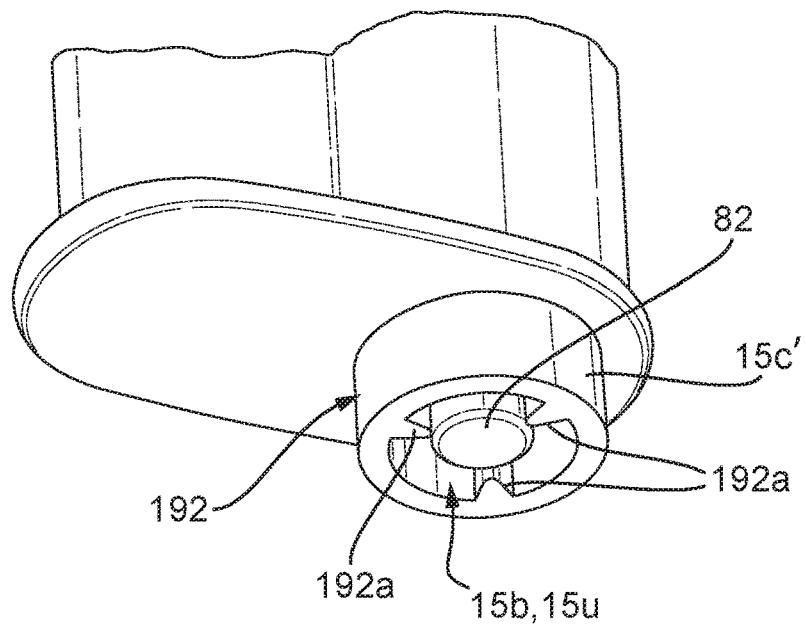
FIG. 14 shows a detail, in perspective view, of the further embodiment of FIG. 13.
Figure 15:
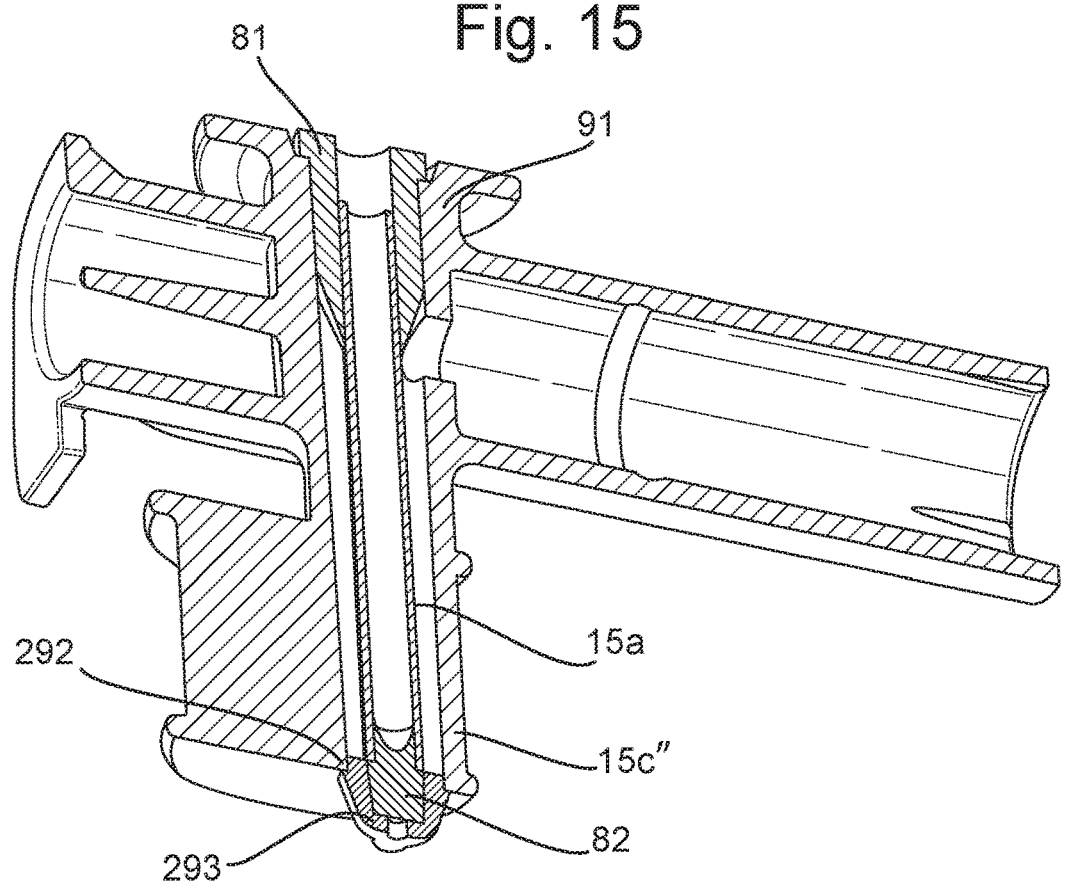
FIG. 15 is similar to FIG. 13, showing an alternative further embodiment of the second holding structure.

As follows from FIGS. 7-10, the second positioning structure 82 of the tubular microfiltration element 15a has a tapered, conical—in particular frusco-conical, positioning surface 15s. In the present example, the second holdings structure 92 is configured for snuggingly receiving at least part of the second positioning structure of the tubular microfiltration element 15a; to that aim, it may e.g. include an interior conical surface for concentrically receiving the second positioning structure 82 during assembly. In particular, as follows from the drawings, the second holdings structure 92 is configured for guiding an entering second positioning structure 82 to a final operating position (as in FIGS. 9, 10), during assembly. Alternative examples are shown in FIGS. 13-15 (see below).

The second positioning structure 82 as such is also configured to seal (i.e. close off) the downstream end 15V of the tubular microfiltration element 15a (preferably via an airtight sealing), in particular to prevent flow through that downstream end 15V (see the drawings). In particular, the downstream end 15V of the tubular microfiltration element 15a is embedded with (i.e. within) the second positioning structure 82.

Preferably, the second positioning structure 82 is a rotationally symmetrical structure (concentric with a center axis of the respective tubular element 15a).

In this example, an upstream section of the second positioning structure 82 of the tubular microfiltration element 15a protrudes radially from an outer surface of the respective element 15a, in particular providing a product guiding surface (for guiding the second positioning structure 82 into the respective holdings structure 92 during assembly) that expands radially viewed along a center line of the tubular element 15a, the guiding surface for example extending along a first virtual conical plane. Further, at least part of a downstream upstream section of the second positioning structure 82 of the tubular microfiltration element 15a protrudes radially from an outer surface of the respective element 15a, for example along a second virtual conical plane.

Moreover, advantageously, after assembly, the second positioning structure 82 of the tubular microfiltration element 15 a is located opposite the product discharge exit 15 u in the side wall 15 w of the housing 15 c (see FIG. 5). In the present example, the outer surface of the second positioning structure 82 facing said exit 15 u is configured for directing an incoming product flow (coming from the upstream feedthrough channel 15 b) towards the exit, in particular in a discharge flow direction that includes (viewed in cross-section) a second angle α2 with a virtual lateral plane P2 of the interior processing space of the housing 15 c (see FIG. 7), said angle α2 in particular being in the range of about 10-80 degrees and more preferably being in the range of about 20-60 degrees. As follows from the drawings, the outer surface of the second positioning structure 82 can be conical to extend along said second angle α2, viewed in the cross-section, to provide the local flow redirection towards the product exit 15 u.

It follows that the second positioning structure 82 not only provides for a swift and accurate positioning of the respective tubular microfiltration element 15a into the housing during assembly, but also acts as a flow redirecting element for allowing controlled product discharge via a conical exit plane, into a downstream product collector 16.

Preferably, a maximum radial dimension, e.g. a maximum diameter, of the second positioning structure 82 is smaller than a width (inner diameter) of the interior processing space of the microfiltration device 15, so that the second positioning structure 82 can be inserted into the processing space during assembly to be brought to its final position, seated on the respective second holding structure 92 of the housing.

Preferably, as is indicated in FIG. 12, a distance L2 between a bottom surface 82V of the second positioning structure (the bottom surface facing away from the respective tubular microfiltration element 15*a*) and a lower (support) surface of the rim 81*a* of the first positioning structure 81, measured in parallel with a center axis of the tubular element 15*a*, can be a predetermined, constant distance. This distance can be set accurately during the manufacture of the positioning structures 81, 82 onto the tubular element 15*a* (as is explained below), and can correspond precisely to the distance with respect of two corresponding supporting surfaces of the first and second holding structures 91, 92 of the housing. Thus, a well defined and very stable positioning of the tubular element 15*a* can be achieved, such that the element 15*a* extends centrally through the respective processing space, preferably along a straight line (i.e. unbended).

In a highly preferred embodiment, the second positioning structure 82 is manufactured by overmolding, in particular by plastic injection molding the structure onto the tubular microfiltration element 15*a*, wherein the first positioning structure 81 is preferably also manufactured by overmolding, in particular during the same overmolding process as the second positioning structure 82. As the skilled person knows, overmolding is a technique wherein two materials are molded together: the first molded part is positioned so that the second material can be molded around, over, or through it (see e.g. Injection Molding Handbook, $3^{rd}$ edition, 2000, Edited by D. V. Rosato, D. V. Rosato, M. G. Rosato, Kluwer Academic Publishers, page 1254).

FIG. 11 schematically shows part of a respective manufacturing method. The method includes: providing a tubular microfiltration element 15*a*, having gas transmissive pores, wherein the tubular microfiltration element 15*a* has an first end 15T and a second end 15V, both ends being initially open ends.

The method involves manufacturing the first positioning structure 81 onto the first end of the tubular microfiltration element 15*a*. The first positioning structure 81 is manufactured by overmolding, in particular by plastic injection molding the structure onto the tubular microfiltration element 15*a*. Major mould parts are not shown in the drawing, only mould sliders MS as well as a holding pin R2 (e.g. a steel pin) for holding the microfiltration tube 15*a* in the mould. An example of a suitable moulding process as such is described in e.g. WO2017/088975 (however, in that case, a tubular element having a closest distal section is used).

In the present example, the second positioning structure 82 is also manufactured by overmolding, in particular during the same overmolding process as the first positioning structure 81. The second positioning structure 82 of the tubular microfiltration element 15*a* is formed to protrude radially from the outer (cylinder) surface of the element 15*a*, in particular providing an external surface that expands radially viewed along a center line of the tubular element 15*a*, for example a surface extending along a first virtual conical plane. The second positioning structure 82 closes the respective end 15V of the tubular element 15*a*, and is shaped in the above-described manner to allow precise assembly of the microfiltration device 15 as well as to provide flow redirection properties. Also, the (plastic injection) overmolding leads to a secure fixation of the two positioning structures 81, 82 onto the tube 15*a*. In particular, micro filtration pores at the ends 15T, 15V of the tube 15*a* can become at least partly filled with the plastic, allowing firm embedding of the tube 15*a* in the structures 81, 82. Also, this can provide a secure gastight connection between the components 15*a*, 81, 82.

In an embodiment, a length of the microfiltration element 15*a* is expanded during placement into the interior processing space of the housing 15*c* from an initial length L3 to a final operating length L4, in particular axially tensioning that element 15*a*.

After its manufacture, the tubular micro filtration element 15*a* can be placed into the processing unit's housing 15*c*, the housing having the first holding structure 91 located at or near a first end of the interior processing space, and wherein the housing has the second holding structure 92 located at or near a second end of the interior processing space. The microfiltration element 15*a* can be inserted into the interior processing space of the housing 15*c* (e.g. using the positioning tool R) such that its first positioning structure is received by the first holding structure 91 of the housing 15*c*, and such that its a second positioning structure 82 is received by the second holding structure 92 of the housing 15*c*.

Thus, the invention can provide a 2-sided overmolded membrane 15*a*, wherein both the top 15T and bottom section 15V can be overmolded by an injection moulding process. In this way, overall performance (e.g. foam quality) and system robustness can be achieved. In particular, as follows from the above, the microfiltration element 15*a* can be provided a fixed position of the respective membrane holding part of the processing unit PPU, leading to improved product processing (e.g. foam quality).

Also, the overmolded sections 81*a*, 82 can ensure leakage tight closures at both the top and bottom membrane sections 15T, 15V. Moreover, membrane straightness can be improved or insured after assembly (no bending).

In the present examples, due to the particular shapes of the external surfaces of the two positioning structures 81, 82, optimal 'in flow' of product at membrane top-section, as well as ensure optimal 'out flow' of processed product at membrane bottom section can be achieved.

Besides, the overmolded top-section 81 can determine an exact vertical position (fixed 'hard stop' during assembly) of the membrane such that the product 'in-flow' channel can be exactly lined up in a robust way (providing improved performance of the processing unit PPU).

The overmolded bottom-section 82 can ensure an exact centered position (fixed) of the membrane relative to the membrane holder, thus preventing membrane bending to occur (again providing improved performance of the processing unit PPU).

Besides, the present structure can provide improved manufacturability, for example providing automated and/or inline or semi-inline manufacture of processing units PPU for product holders H.

FIGS. 13-14 show a further embodiment of the invention, which differs from the embodiment of FIGS. 3-12 in that the second holding structure 192 of the of the PPU housing 15*c'* includes a plurality (in this case three) of inwardly protruding ribs 192*a*, protruding from an inner side of the downstream end of the product feedthrough channel 15*b*. Preferably, the ribs 192*a* are evenly distributed viewed along a circumference of the product feedthrough channel 15*b*. Inner edges of the ribs 192*a* may e.g. extend along a virtual conical plane, substantially matching a conical shape of the external surface 15s of the of the second positioning structure 82 of the tubular microfiltration element 15a, for firmly supporting (and centering) that surface after assembly (as in the drawing). The positioning ribs 192a and the opposite second positioning structure 82 of the tubular microfiltration element 15a can provide open spaces there-between, providing respective product exits 15u of the microfiltration device. As follows from FIG. 13, the first holding structure 91 and respective first positioning structure 81 may be the same as those structures of the first embodiment described above (see FIGS. 4-7).

Figure 16:
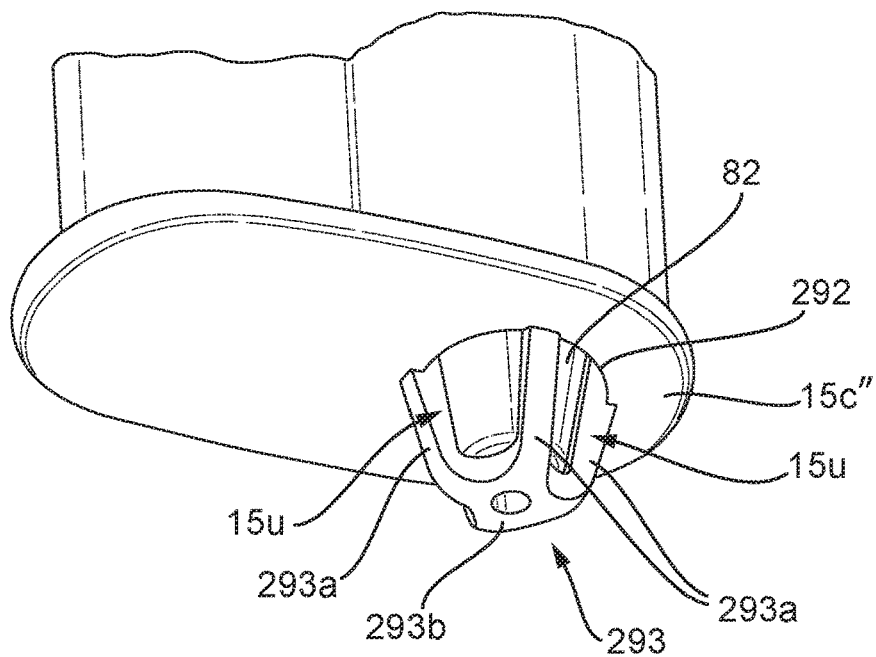
FIG. 16 shows a detail of the an alternative further embodiment of FIG. 15.

FIGS. 15-16 shows another alternative embodiment, which differs from the example shown in FIGS. 13-14 in that the second positioning structure 82 of the tubular microfiltration element 15a is indirectly supported by the holding structure 292 of the housing via an intermediate spacer element 293. The spacer element 293 may be configured to firmly engage the holding structure 292 of the housing, for example via a clamping connection, a snap-fit connection, a hook or teeth engagement connection, via a fixation means, for example an adhesive or glue. Also, the spacer element 293 is configured to stably support the second positioning structure 82 of the tubular microfiltration element 15a, after assembly. In particular, to that aim, the spacer element 293 can be configured to bridge or partly cover a downstream opening of the interior processing space of the housing 15c" of the microfiltration device 15 (see FIG. 15), wherein the spacer element 293 can be shaped or configured to allow product discharge by providing a product exit 15u therethrough.

In the present example, the spacer element 293 includes a plurality of spacer arms 293a and integral spacer bottom 293b. After assembly, distal ends of the spacer arms 293a are engaged with the housing 15c" of the microfiltration device. Product exits 15u are defined between opposite edges of the spacer arms 293a.

In a preferred embodiment, the spacer arms 293a are resilient arms, that can be folded toward each other (to a spring biased state) before assembly, whereas a maximum width of the arms and respective bottom 293b is preferably smaller than the width of the interior processing space of the housing 15c". In that case, assembly can involve inserting the microfiltration element 15a into the interior processing space of the housing 15c (e.g. using the afore-mentioned positioning tool R) together with the spacer element 293. During the inserting, the spacer element 293 can be pushed through the processing space (in an inwardly folded, spring-biased state) towards its final supporting position (shown in FIGS. 15-16) in which it can fold outwardly (via internal spring force) to automatically engage the housing 15c" of the microfiltration device. An automatic engaging of the housing can involve e.g. a snap-fit or hook-gripping connection. As follows from FIG. 15, the first holding structure 91 and respective first positioning structure 81 may be the same as those structures of the first embodiment described above (see FIGS. 4-7).

According to a further preferred embodiment, which can be combined with any of the embodiments shown in FIGS. 3-16, a tubular elastic or resilient microfiltration element 15a is used, in which case it is preferred that the microfiltration element 15a is held in an axially tensioned (strained) state via its positioning structures 81, 82 and the holding structures 91, 92 (and 192, 292). In particular, the tubular microfiltration element 15a itself may have an initial length L3 in an axially unstrained state, wherein a length L4 of the tubular microfiltration element 15a is larger than said initial length (i.e. the element is axially expanded) after assembly into the housing of the microfiltration device 15. The difference in lengths (L4>L3) is indicated in FIGS. 17A, 17B, wherein FIG. 17A shows the tubular microfiltration element 15a in a pre-assembly condition and FIG. 17B shows the element 15a' after assembly. The difference in length L4−L3 may be relatively small, e.g. in the range of about 1-5 mm, or e.g. it may be at most 1-5% of the initial length L3 of the tubular element 15a. The axial tensioning of the tubular element 15a provides for improved, stable positioning of that element 15a in the respective processing space of the processing unit PPU, leading to better and more reliable operation. The axial straining of the tubular element 15a can be achieved e.g. simply during or as a result of the positioning of the element 15a into the housing 15c of the processing unit PPU (e.g. microfiltration device 15). To that aim, the holding structures 91, 92 (192, 292) of the housing 15c can be arranged to receive the respective positioning structures 81, 82 of the tubular element 15a, or to cooperate with those positioning structures 81, 82, for axially tensioning that tubular element when it is in its final operation position.

It is self-evident that the invention is not limited to the above-described exemplary embodiments. Various modifications are possible within the framework of the invention as set forth in the appended claims.

Thus, the product P can comprise, for instance, an edible or non edible protein, a protein mixture or protein solution. An edible protein solution can comprise, for instance, a milk protein, a whey protein and casein, egg white proteins, yeast isolate, soy protein, hemoglobin, vegetal protein isolate, meat protein, collagen, gelatin and the like.

The product may be, for instance, homogeneously or non homogeneously foamed.

The product can be a food product, or a cosmetic product, a cleaner and/or a different type of product.

The product can further contain various substances, for instance, a thickener, coloring, flavoring and the like.

Furthermore, the product is, in particular, a food, for instance, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream, dessert or the like. The product can further comprise, for instance, vegetal or animal fat or oil, a thickener, sugar, sweeteners, flavoring, coloring and/or the like, and/or various other ingredients, which will be clear to the skilled person. The product can also comprise, for instance, a non-consumable product, a body care product, a hair treating agent, or the like.

Further, the dispensed product can be, for instance, a hot product. To this end, the product, before being placed in the holder, may already be heated with means known for that purpose (e.g., microwave, steam, electric, convection, or other means). Also, the method and the system according to the invention may utilize or be provided with, for instance, heating means (for instance, a heating system), to heat the product.

According to a further elaboration, heating of the product is carried out upstream with respect to the microfiltration device, for instance, by supplying heat to and/or into the product holder H, and/or by heating product at a location between the product holder and the microfiltration device. This heating may be, for instance, between 20° C. and 90° C., preferably between 40° C. and 75° C. Furthermore, product heating may be carried out downstream with respect to the microfiltration device, for instance, in and/or upstream with respect to an outflow line 66. The heating means can be designed, for instance, to heat product flowing through the product discharge means 6, and/or to heat gas to be supplied to the product, and/or to heat an optional mixing device and/or a microfiltration device, and the like. According to a further elaboration, the heating means may be designed, for instance, to bring the microfiltration device to a temperature that is suitable for heating (i.e., increasing the temperature) of the product flowing past. According to a further elaboration, the heating means may be designed to bring a processing device or product processing unit PPU to a temperature that is suitable for heating the product flowing past.

In addition, the method (and the system) can utilize at least two product flows (two product parts), where a first product part is foamed by a present method (and the system, respectively) and then combined (by the method and the system, respectively) with a second, non-foamed product part (and, for instance, is mixed therewith). The product discharge means or product processing unit PPU may be provided with a branch, to provide, from this branch, a first product flow and a second product flow separate therefrom. The first product flow is then foamed, and thereupon combined again with the second product flow (and, for instance, mixed therewith). In product heating, there may be heated, for instance, a first product stream as mentioned, or, conversely, a second product stream as mentioned, or both.

Further, should a downstream mixing device be present in the product processing unit PPU, preferably static means are utilized, for instance, a static microfiltration filter and an optionally static membrane. In an alternative embodiment, for instance, a moving filter (and/or optionally dynamic membrane) can be utilized.

The present invention (method and system) may be used to provide various products, for instance, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream, dessert, or other products.

The invention can prepare hot pourable foams, for instance, cappuccino, latte macchiato, chocolate drinks, and other hot (milk) drinks, with or without flavor additions. In addition, non-dairy drinks can be prepared, or products that are intended for consumption. In a further elaboration, to that end, the product is foamed to a minimum overrun of 10%, and obtains/has immediately after dispensing a temperature between 20 and 90° C., preferably between 40 and 70° C. The product may be, for instance, predominantly pourable (for instance, with an overrun lower than 100%). The heating means mentioned can be used to dispense warm pourable product. The pourable product may be obtained, for instance, by combining a non-foamed product part and a foamed product part. In an embodiment, the invention is used for producing foamed milk, e.g. having an overrun in the range of about 50-60%.

Alternatively, the invention can prepare cold and ice-cold drinks, for instance, milk drink, milk shake, chocolate drink, lunch drink, yoghurt drink, fruit drink, alcohol-containing drink such as beer or wine, etc. In that case, the product can have, for instance, a minimum overrun of 10%, and a temperature lower than 20° C., preferably a temperature between −5 and 10° C. The cold, dispensed product may be predominantly pourable, and can comprise a sweet or, conversely, a salty product, a fermented milk product, juice, or other product.

Furthermore, the invention can be used to provide hot and cold foamed sauces, for instance, a sweet sauce, sour sauce, salty sauce and/or other sauce. Such a sauce obtained by means of the invention can have a minimum overrun of 1%, and a temperature in the range of from −20° C. to 80° C.

A dessert prepared by means of the invention, for instance, a mousse, vla or yoghurt, can have a minimum overrun of 10%, and, for instance, a temperature of 1° C. to 40° C. (preferably a temperature lower than 10° C.). Spray cream is a specific use where cream is realized that has a higher overrun (preferably higher than 300%) and improved stability over conventional products.

The invention is particularly well-suited to prepare ice cream or a (milk) shake. The ice cream or (milk) shake product can have an overrun in the range of 10%-200%, and a temperature of 0° C. or lower (preferably a temperature in the range of −10° C. to −2° C.).

The invention (method, system, or both) can be used, for instance, such that a product mentioned undergoes an overrun that is greater than 100% (in particular approximately 150% or more, and more particularly approximately 200% or more), utilizing a relatively low pressure (in particular a pressure of gas supplied to a gas supply space mentioned), for instance, a pressure lower than 2 bar. The invention (method, system, or both) can be used, for instance, such that a product mentioned undergoes an overrun that is greater than 100% (in particular approximately 150% or more, and more particularly approximately 200% or more), while the dispensed product has a relatively low temperature, for instance, a temperature of approximately 0° C. or lower.

Furthermore, the invention (method, system, or both) may be so configured that the product P downstream of the microfiltration device does not undergo any mixing treatment, and does not undergo any controlled pressure reduction. For example, as the product semi-skimmed milk or a concentrate thereof can be used. Also other products can be treated according to a method (and/or by a system) so configured that the product P downstream of the microfiltration device does not undergo any mixing treatment, and does not undergo any controlled pressure reduction, for instance, a food product, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, in particular a dairy product, or a product not intended for consumption.

According to a preferred embodiment, as follows from the above, the system is not provided with a processing device downstream with respect to the microfiltration device 15 (so that the system performs no mixing treatment and no pressure reduction treatment on the product provided with gas). In an alternative embodiment, however, such an additional downstream processing device is provided in the system.

Further, the second positioning structure 82 of the tubular microfiltration element can be held by the second holding structure 92 of the housing 15c in various ways, for example directly or indirectly via additional support means (as follows from the above).

Besides, the product processing unit PPU can include a plurality of microfiltration devices 15, e.g. including at least two or more tubular microfiltration elements 15a in respective processing spaces, to increase throughput.

The invention claimed is:
1. A product dispensing system comprising:
a holder, which contains a product to be dispensed; and a microfiltration device fluidly connected to the holder for processing and discharging product received from the holder, wherein the microfiltration device comprises:

a housing having an upstream end, a downstream end, a side wall, a product entrance for receiving product; a gas inlet connection for receiving gas; and an exit connection in the side wall for discharging a processed product, wherein a tubular microfiltration element having a wall with gas transmissive pores is removably positioned inside the housing to define and separate a gas supply space from a product feed-through channel, wherein the gas supply space is fluidly connected to the gas inlet connection and the product feed-through channel is fluidly connected to the product entrance, wherein gas passes from the gas supply space into the product feed-through channel and the processed product provided with gas is discharged from the housing through the exit connection, wherein the tubular microfiltration element is removably secured in the housing at the upstream end at or near the gas inlet connection and at the downstream end below the exit, wherein the upstream end of the tubular microfiltration element is integrally provided with a first positioning structure which is held by a first holding structure of the housing, wherein the downstream end of the tubular microfiltration element is integrally provided with a second positioning structure, which sealingly contacts and is held by a second holding structure of the housing to prevent the passage of the processed product, wherein the second positioning structure of the tubular microfiltration element is located opposite the exit connection of the housing, wherein an outer surface of the second positioning structure facing said exit connection is configured for directing an incoming product flow towards the exit connection, along a discharge flow direction that-viewed in cross-section-includes an angle with a lateral direction of the interior processing space of the housing, and wherein the second positioning structure of the tubular microfiltration element has a tapered, conical or frustoconical positioning surface.

2. The product dispensing system according to claim 1, further comprising a product processing unit for processing and discharging product coming from the holder, wherein the product processing unit includes the microfiltration device and a dispensing machine, wherein the dispensing machine is configured for exchangeably receiving the holder and the product processing unit is an integral part of the holder, wherein the dispensing machine includes means for operating the product processing unit of a placed product holder for discharging product.

3. The product dispensing system according to claim 1, wherein each of the first and second positioning structures are made of rigid material.

4. The product dispensing system according to claim 1, wherein the second holding structure is configured for receiving at least part of the second positioning structure of the tubular microfiltration element during assembly of the microfiltration device.

5. The product dispensing system according to claim 1, wherein the downstream end of the tubular microfiltration element is embedded within the second positioning structure, the second positioning structure sealing the downstream end of the tubular microfiltration element via an airtight sealing.

6. The product dispensing system according to claim 1, wherein the second positioning structure is manufactured by overmolding the structure onto the tubular microfiltration element.

7. The product dispensing system according to claim 1, wherein an upstream section of the second positioning structure of the tubular microfiltration element protrudes radially from an outer surface of the respective element.

8. The product dispensing system according to claim 1, wherein the downstream end of the tubular microfiltration element is embedded within the second positioning structure.

9. The product dispensing system according to claim 1, wherein a length of the product feed-through channel measured in a product flow direction, and measured between opposite ends of the first and second positioning structures, is at most 10 cm.

10. The product dispensing system according to claim 1, wherein the gas transmissive pores of the wall of the microfiltration element have a pore size in a range of 0.1-10 microns.

11. The product dispensing system according to claim 1, wherein the gas inlet supplies gas under superatmospheric pressure to the microfiltration device.

12. The product dispensing system according to claim 1, wherein the product processing unit includes a jet pump, for pumping product from the product holder to the product entrance of the microfiltration device.

13. The product dispensing system according to claim 1, wherein the system includes a liquid supply for supplying a liquid to the product upstream of the product entrance of the microfiltration device.

14. The product dispensing system according to claim 1, wherein each of the first and second positioning structures are made of rigid material, wherein the tubular microfiltration element is made of a flexible, elastic material.

15. The product dispensing system according to claim 1, wherein a modulus of elasticity of the material of the first and second positioning structures is higher than a modulus of elasticity of the material of the tubular microfiltration element.

16. The product dispensing system according to claim 1, wherein the second positioning structure is manufactured by plastic injection molding the structure onto the tubular microfiltration element.

17. The product dispensing system according to claim 1, wherein the second positioning structure is manufactured by overmolding, and wherein the first positioning structure is also manufactured by overmolding during the same overmolding process as the second positioning structure.

18. The product dispensing system according to claim 1, wherein said angle being in the range of 10-80 degrees.

19. The product dispensing system according to claim 1, wherein said angle being in the range of 20-60 degrees.

20. The product dispensing system according to claim 7, wherein the upstream section of the second positioning structure of the tubular microfiltration element that protrudes radially from the outer surface of the respective element provides a product guiding surface for guiding the positioning structure into the respective holding structure of the housing during assembly, the guiding surface expanding radially viewed along a center line of the tubular element.

21. The product dispensing system according to claim 20, wherein the guiding surface extends along a first virtual conical plane.

22. The product dispensing system according to claim 1, wherein a length of the product feed-through channel measured in a product flow direction, and measured between opposite ends of the first and second positioning structures is in a range of approximately 0.5-5 cm.

23. The product dispensing system according to claim 1, wherein the gas transmissive pores of the wall of the microfiltration element have a pore size in a range of between at least 0.1 micron and less than 2 microns.

24. The product dispensing system according to claim 1, wherein the gas transmissive pores of the wall of the microfiltration element have a pore size in a range of between at least 0.2 micron and less than 1.5 microns.

25. The product dispensing system according to claim 12, wherein the jet pump uses hot water as a pumping medium.

26. The product dispensing system according to claim 13, wherein the liquid is water.

27. The product dispensing system according to claim 1, wherein the second positioning structure is manufactured by plastic injection overmolding the structure onto the tubular microfiltration element, wherein the first positioning structure is also manufactured by overmolding during the same overmolding process as the second positioning structure.

28. The product dispensing system according to claim 1, wherein the microfiltration element has a length of 50 cm or less.

* * * * *